United States Patent [19]
Ooki et al.

[11] Patent Number: 5,602,824
[45] Date of Patent: Feb. 11, 1997

[54] OPTICAL DISK CAPABLE OF RECORDING INFORMATION ON BOTH LAND AND GROOVE TRACKS

[75] Inventors: Hirohsi Ooki; Yuwa Ishii, both of Yokohama, Japan

[73] Assignee: Nikon Corporation, Japan

[21] Appl. No.: 513,652

[22] Filed: Aug. 10, 1995

[30] Foreign Application Priority Data

| Aug. 12, 1994 | [JP] | Japan | 6-190695 |
| Sep. 9, 1994 | [JP] | Japan | 6-215137 |
| Sep. 9, 1994 | [JP] | Japan | 6-215138 |

[51] Int. Cl.$^6$ ................................................ G11B 7/24
[52] U.S. Cl. ................................ 369/275.4; 369/275.1
[58] Field of Search ........................ 369/275.4, 275.1, 369/275.3, 277, 278, 279; 430/320, 321; 428/64.1, 64.2, 64.4

[56] References Cited

U.S. PATENT DOCUMENTS

| 4,423,502 | 12/1983 | Dil | 369/275.4 |
| 5,353,277 | 10/1994 | Yasuda et al. | 369/275.4 |
| 5,444,689 | 8/1995 | Ohki et al. | 369/275.4 |

FOREIGN PATENT DOCUMENTS

| 0626679 | 11/1994 | European Pat. Off. . |
| 2091028 | 7/1982 | United Kingdom . |

OTHER PUBLICATIONS

Patent Abstracts of Japan, vol. 18, No. 74, Feb.7, 1994 of JP 5282705, Oct. 29,1993.
Bouwhuis et al., "Principles of Optical Disc Systems", Nov. 1985.
Miyagawa et al., "High Track Density Recording by Land and Groove Method on Phase Change Optical Disks";
Fukumoto et al., Cross–Talk Analysis of Land/Groove Magneto–Optical Recording, from Technical Digest Symposium on Optical Memory 1994 (Jul. 11–13, 1994), Tokyo, Japan.

*Primary Examiner*—Tan Dinh
*Attorney, Agent, or Firm*—Pennie & Edmonds

[57] ABSTRACT

An optical disk has neighboring land tracks, and groove tracks for separating the land tracks. Pits each having a predetermined depth are formed on the land tracks, and islands each having a predetermined height are formed on the groove track.

14 Claims, 13 Drawing Sheets

Fig. IC
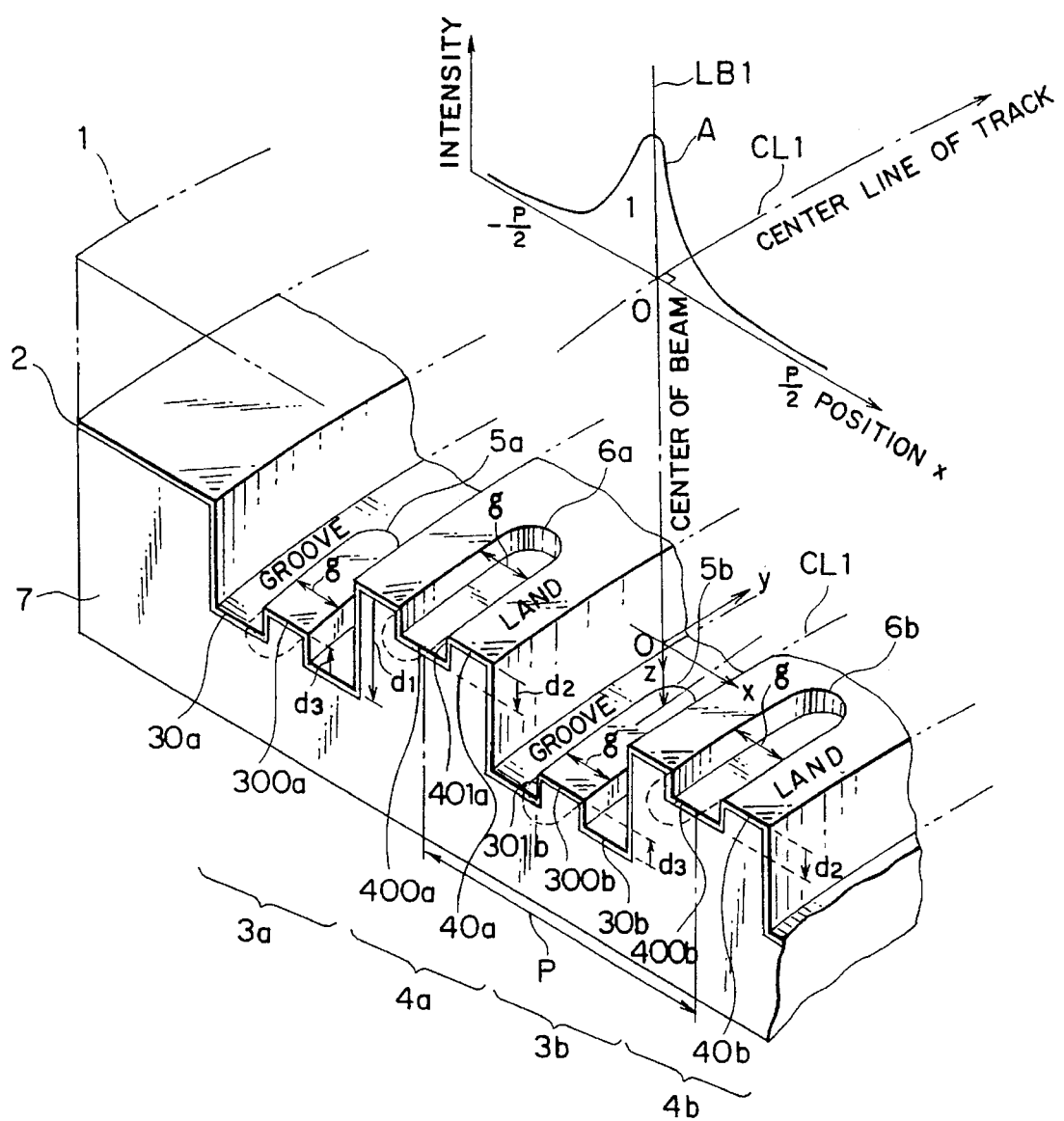

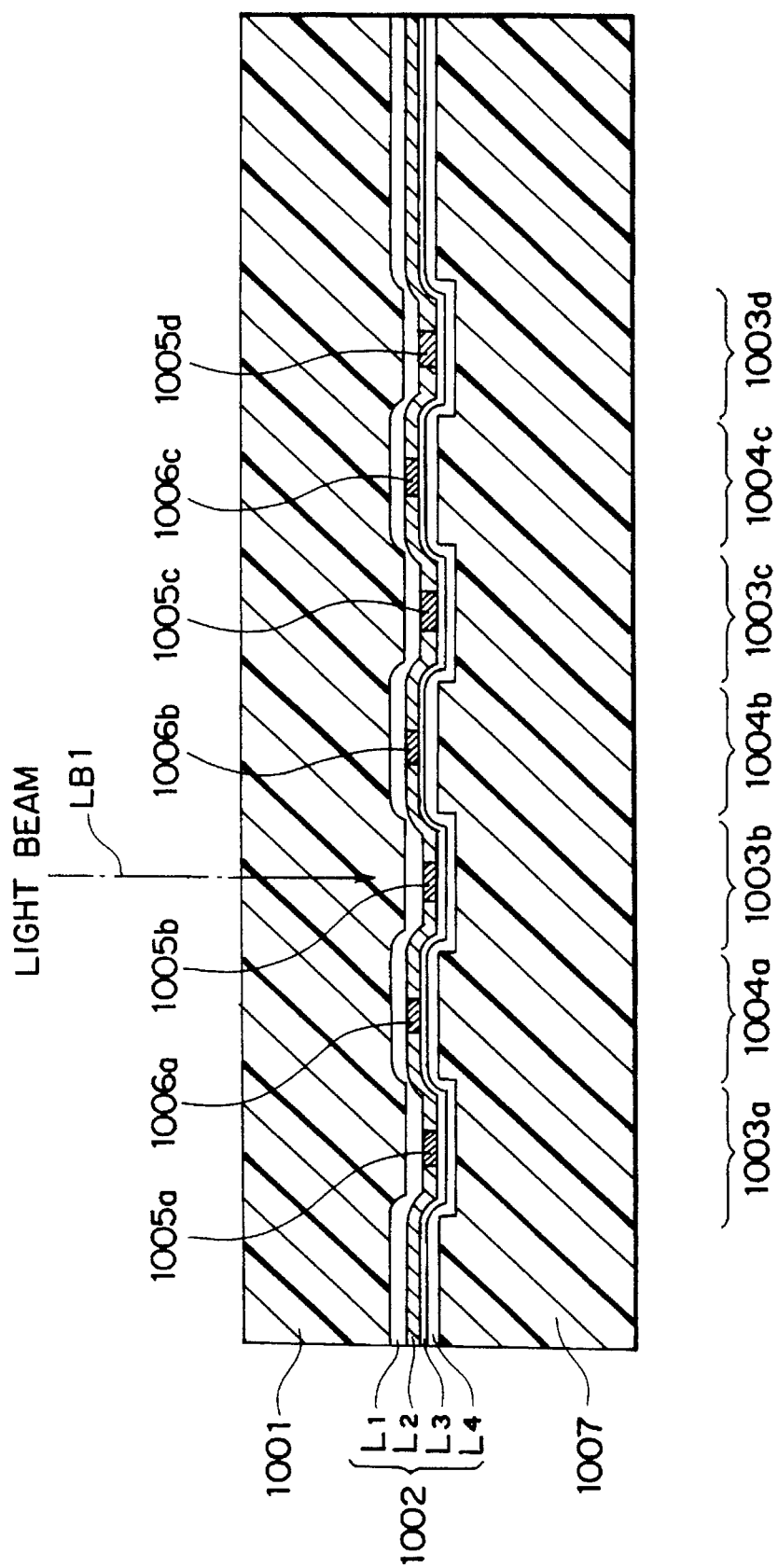

5,602,824

1

OPTICAL DISK CAPABLE OF RECORDING INFORMATION ON BOTH LAND AND GROOVE TRACKS

BACKGROUND OF THE INVENTION

1. Field of the Invention

The present invention relates to an information recording medium and, more particularly, to an optical disk memory such as a compact disk (CD), a magnetooptical disk (MO), and the like, from which information can be read out using light.

2. Related Background Art

Optical disks are classified into read-only type disks on which information is recorded in advance, and recording/reproducing type disks on which a user can desirably record signals. The recording/reproducing type disks are further classified into a write-once type disk on which permanent recording is performed, and an erasable type disk on which a new signal can be recorded by erasing recorded information. Typical read-only type optical disks include audio disks (CD) and video disks for home use.

On a recording/reproducing type optical disk, recording is attained by irradiating a laser beam modulated by a signal onto a rotating disk to locally change the state of a recording thin film. The recorded signal is reproduced by irradiating a weak constant light beam which does not change the thin film and detecting the change in light reflected by the disk. Such an optical disk is practically applied to a video image file and document file for business use, and an external memory of a personal computer.

FIG. 6 shows the structure of a normal CD. When this CD is inserted into a CD player, audio data is reproduced. In this CD, relief-like phase pit arrays 82 are spirally formed on a 1.2-mm thick transparent substrate 81. The respective phase pit arrays serve as information tracks. More specifically, audio information is recorded in the CD as the lengths of phase pits.

CDs are popularly used as information recording media in audio equipments and computers. Such an information recording medium is described in U.S. Pat. No. 4,423,502.

SUMMARY OF THE INVENTION

When a CD is inserted into a CD player, the CD is rotated, and a light beam emitted by a reproduction head is irradiated onto the CD. The size of the light beam, i.e., the radius of the beam spot irradiated onto the CD, is slightly larger than the width of each phase pit formed on the CD. By detecting the diffraction state of the beam spot irradiated onto and reflected by an information track, information stored in the CD is reproduced.

When no phase pit is formed at the position of the beam spot, all the light components reflected by the information track return to the reproduction head. For this reason, an information detector incorporated in the head detects a large value.

When a phase pit is formed at the position of the beam spot, light components reflected by the information track are diffracted by the phase pit. Some light components of the reflected light components pass outside the reproduction head due to diffraction, and do not return to the reproduction head. Some other light components of the reflected light components return to the reproduction head. Therefore, the information detector incorporated in the head detects a small value.

2

The radius of the light beam emitted by the reproduction head can be focused to the diffraction light of the light. The radius of the beam spot irradiated onto the information track can be set to be 1 μm or less. The pitch (interval) of the information tracks can be set to be 1.6 μm.

In order to increase the information amount per unit area to be stored in the CD, the pitch of the information tracks can be decreased, and the wavelength of a reproduction beam can be shortened in correspondence with the decreased pitch. However, when the pitch of the information tracks is decreased while the wavelength of the reproduction beam remains the same, i.e., the diameter of the beam spot remains the same, the beam spot is undesirably irradiated onto the phase pit on a neighboring track, and information on the neighboring track is read out.

In a CD according to the present invention, since pits are formed on lands, and islands are formed on grooves, when the depth of the groove satisfies a suitable value, crosstalk from neighboring tracks of the whole disk can be prevented. The height of each island and the depth of each groove are not particularly limited as long as they respectively have the same size.

The present invention will be more fully understood from the detailed description given hereinbelow and the accompanying drawings, which are given by way of illustration only and are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will be apparent to those skilled in the art from this detailed description.

BRIEF DESCRIPTION OF THE DRAWINGS

FIG. 1C is a partially cutaway perspective view for explaining the steps of the optical disk;

FIG. 8B is a sectional view of the optical disk shown in FIG. 8A taken along arrows Z—Z in FIG. 8A;

DETAILED DESCRIPTION OF THE PREFERRED EMBODIMENTS

FIGS. 1A to 1C and FIG. 7 show an optical disk according to the first embodiment.

Figure 1A:
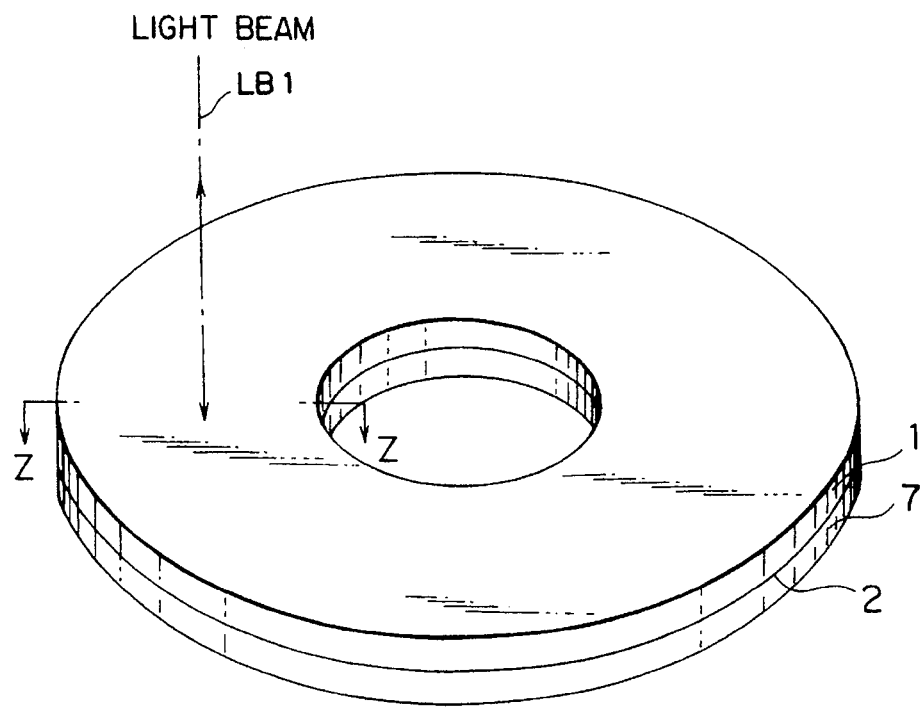
FIG. 1A is a perspective view showing an optical disk according to the first embodiment of the present invention.

As shown in FIG. 1A, the optical disk comprises a substrate 1, a reflection film 2, and a protection film 7. The reflection film 2 is interposed between the substrate and the protection film 7. The substrate 1 consists of a resin such as polycarbonate (PBT) or acrylic resin. The reflection film 2 consists of a metal such as aluminum, nickel, or the like. The aluminum reflection film 2 has a uniform thickness. The protection film 7 consists of a polymeric material such as polymethyl methacrylate. As shown in FIG. 1A, a light beam LB1 is irradiated onto the optical disk. The light beam LB1 is a laser beam having a wavelength ranging from 700 to 800 nm.

Figure 1B:
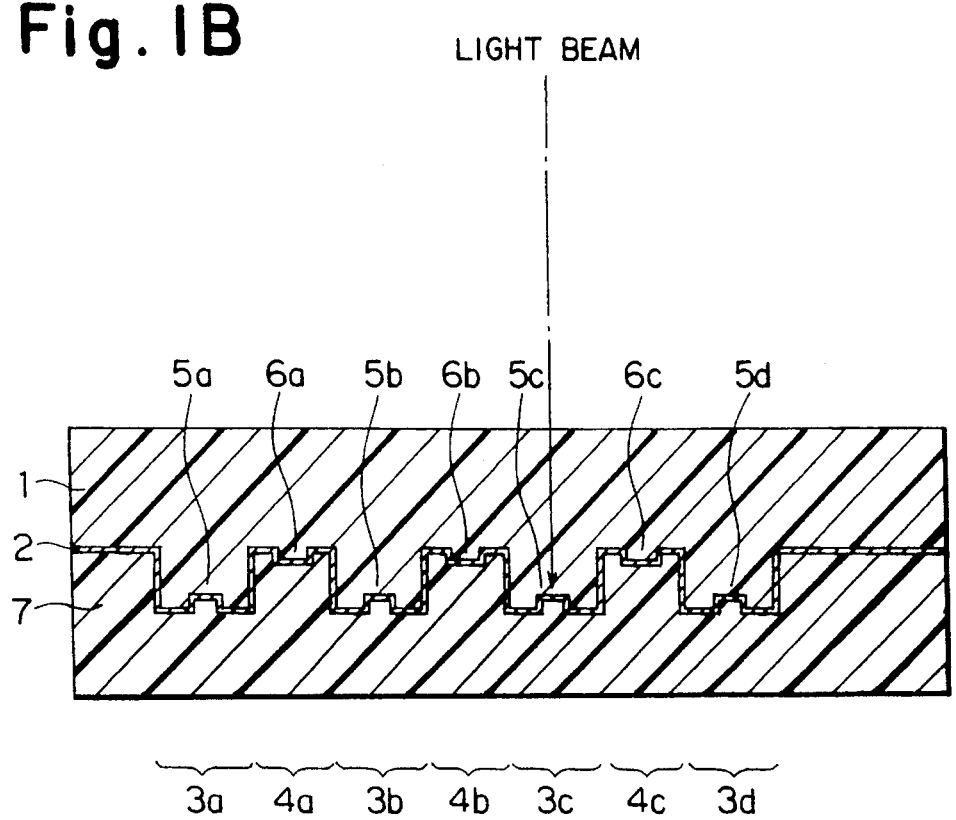
FIG. 1B is a sectional view of the optical disk shown in FIG. 1A taken along arrows Z—Z in FIG. 1A.

FIG. 1B shows the internal structure of the optical disk shown in FIG. 1A. FIG. 1B is a sectional view of the optical disk shown in FIG. 1A taken along arrows Z—Z in FIG. 1A. The substrate 1 has a plurality of tracks ($3a$ to $3d$ and $4a$ to $4c$). Information recording regions $5a$ to $5d$ and $6a$ to $6c$ are respectively formed on these tracks $3a$ to $3d$ and $4a$ to $4c$. The tracks $3a$ to $3d$ are recess tracks, and the tracks $4a$ to $4c$ are projection tracks. The information recording regions $5a$ to $5d$ formed on the recess tracks $3a$ to $3d$ are projections which project in a direction from the protection film 7 toward the substrate 1. The information recording regions $6a$ to $6c$ formed on the projection tracks $4a$ to $4c$ are recesses which are recessed in a direction from the substrate 1 toward the protection film 7. Note that the light beam LB1 propagates in a direction from the substrate 1 toward the protection film 7, and is irradiated onto the optical disk.

The structure of the optical disk will be described in more detail below with reference to FIG. 1C. FIG. 1C shows a portion of the optical disk. FIG. 1C illustrates the recess tracks $3a$ and $3b$ and projection tracks $4a$ and $4b$. The track $4a$ has a flat surface $40a$. The information recording region $6a$ is a pit formed on the track $4a$. The pit $6a$ has a flat bottom surface $400a$ and a side surface $401a$ surrounding the bottom surface $400a$. The structure of the track $4b$ is the same as that of the track $4a$.

The scales of the respective elements will be briefly defined below.

The tracks $4a$ and $4b$ are separated by the track $3b$. More specifically, the tracks $4a$ and $4b$ form lands, and the track $3b$ forms a groove for separating these lands. The track $3b$ has a flat surface $30b$ corresponding to the deep portion of the groove. The information recording region $5b$ on this track is an island (projection) formed on the track $3b$. The island $5a$ has a flat upper surface $300b$ and a side surface $301b$ extending from the perimeter of the upper surface $300b$ toward the surface $30b$. The structure of the track $3a$ is the same as that of the track $3a$.

The distance between the surface $40a$ of the land $4a$ and the surface $30b$ of the groove $3b$ is d1 (nm). Also, the distance between a surface $40b$ of the land $4b$ and the surface $30b$ of the groove $3b$ is d1 (nm).

The depth of each of the pits $6a$ and $6b$ formed on the lands is d2 (nm). The height of each of the islands $5a$ and $5b$ formed on the grooves is d3 (nm).

The width of each of the pits $6a$ and $6b$ is g (nm).

The distance between the centers of the pits $6a$ and $6b$ is p (nm).

An imaginary plane including the surfaces $40a$ and $40b$ of the land tracks $4a$ and $4b$ is defined. Let O be the intersection between this imaginary plane and the normal to the surface $300b$ of the groove track $3b$ at a predetermined point on the center line, CL1, of the groove track $3b$. The point O agrees with the intersection between the imaginary plane and the center of the light beam LB1. The z-direction corresponds to the direction of thickness of the substrate 1. The y-direction corresponds to the direction of the tangent at the predetermined point on the center line CL1 of the track.

Assume that the light beam LB1 is irradiated onto the groove track $3b$. Since the information recording region (island) $5b$ is formed on the groove track $3b$, the light beam LB1 is reflected by the island $5b$. The intensity of the light beam LB1 has a Gaussian distribution along the radial direction, x, of the optical disk, as indicated by a function A in FIG. 1C.

Therefore, when the light beam LB1 is irradiated onto the groove $3b$, light components reflected by the pits $6a$ and $6b$ on the neighboring land tracks are undesirably mixed in the light reflected by the island $5b$. Conditions for minimizing this crosstalk will be explained below.

Let o(x) be the amplitude distribution function of the surface of the reflection film 2.

Assume that tracks in the first group are recess-like tracks (recess tracks) $3a$ and $3b$, and tracks in the second group are projection-like tracks (projection tracks) $4a$ and $4b$.

The recess tracks $3a$ and $3b$ are recessed tracks when viewed from the beam irradiation side, and the projection tracks $4a$ and $4b$ are projecting tracks when viewed from the beam irradiation side.

Figure 2:
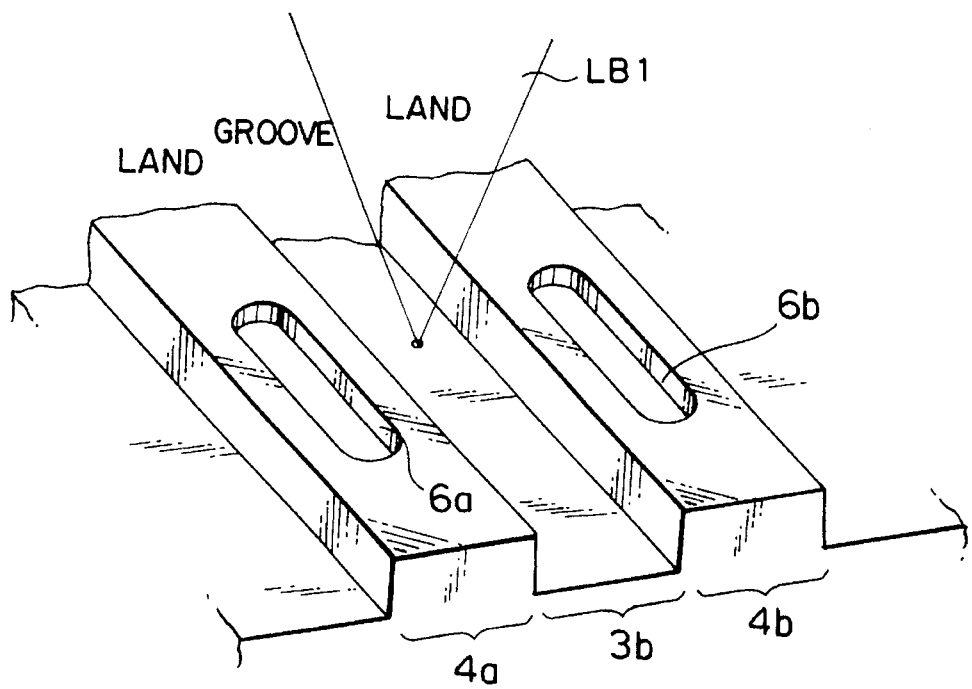
FIG. 2 is a partially enlarged view showing an optical disk which has no information recording areas on grooves.

First, a case will be examined below wherein no signals are recorded on the recess tracks (no phase pits are formed), and signals are recorded on the neighboring projection tracks (phase pits are formed). FIG. 2 shows this state. Referring to FIG. 2, a reproduction beam LB1 is irradiated from the above onto the center of the recess track $3b$.

Figure 3:
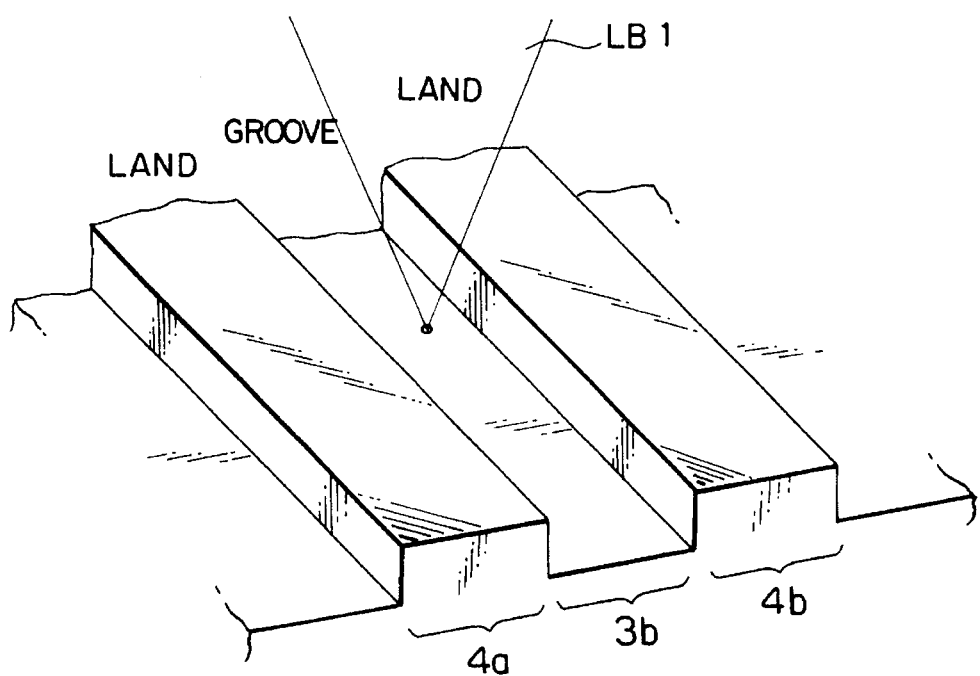
FIG. 3 is a partially enlarged view showing an optical disk which has no information recording areas on grooves and lands.
Figure 4:
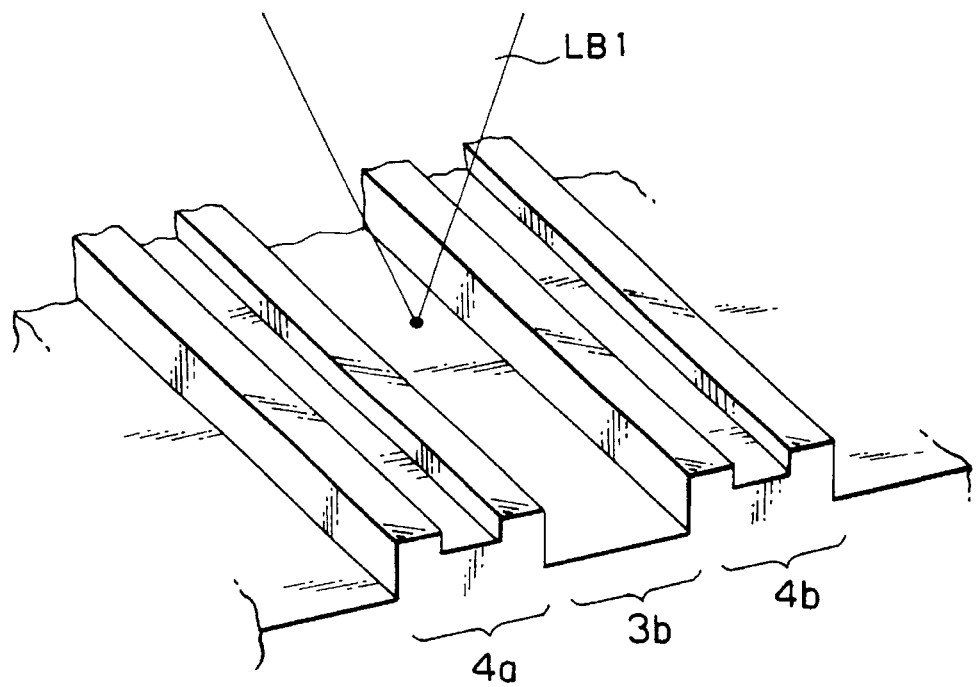
FIG. 4 is a partially enlarged view showing an optical disk which has information recording areas on only lands.

Assuming that the length, in the track direction, of the phase pit shown in FIG. 2 is sufficiently larger than the reproduction beam size (spot diameter), the intensity modulation amount, N, of return light (reflected light) by the pits on the neighboring tracks is equal to the difference between the return light amounts in the states illustrated in FIGS. 3 and 4.

Figure 5:
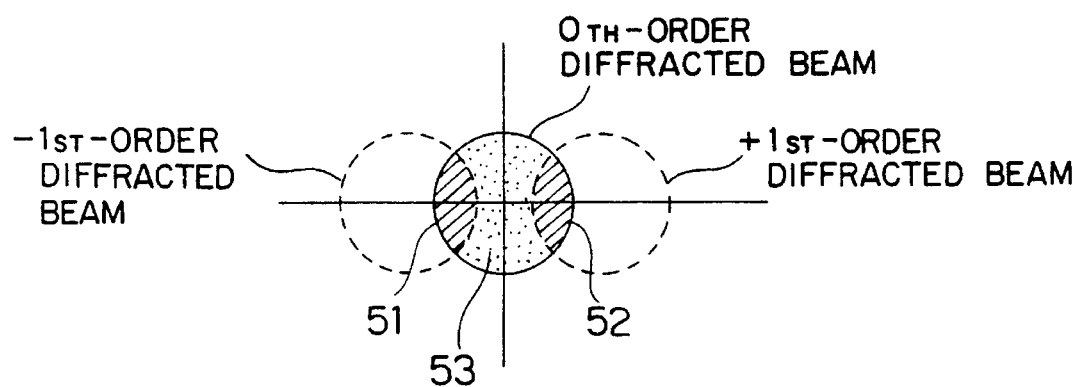
FIG. 5 is a view showing the diffraction pattern of a light beam reflected by the optical disk.
Figure 6:
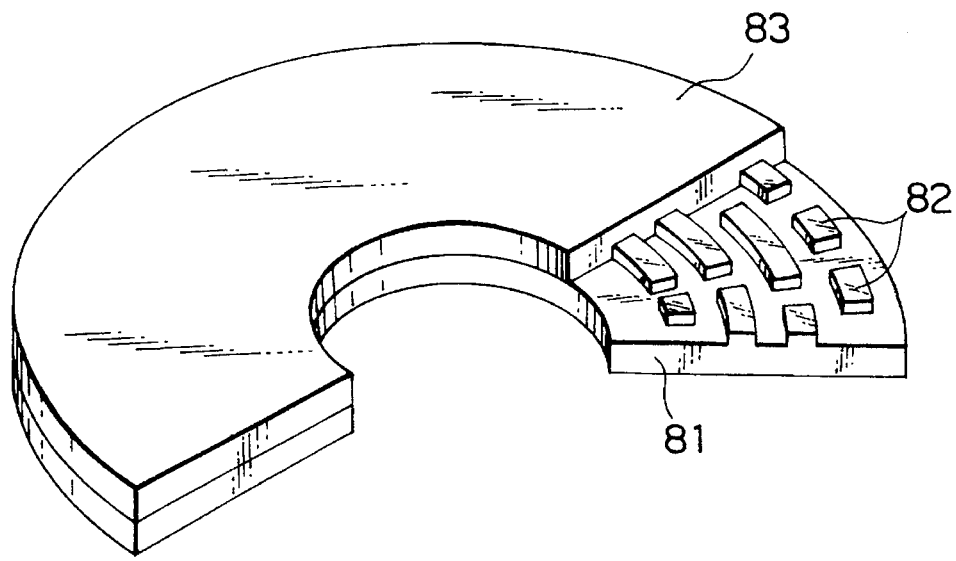
FIG. 6 is a partially cutaway perspective view showing a compact disk.

On the other hand, light reflected and diffracted by the disk surface returns to an objective lens, and forms a diffraction pattern shown in FIG. 5. In FIG. 5, regions 51 and 52 are those in which the 0th-order diffracted light beam and ±1st-order diffracted light beams interfere with each other. A region 53 is one where only the 0th-order diffracted light beam is present. The return light amount is obtained by adding the light intensities on the regions 51, 52, and 53.

Since the step between the recess and projection tracks is d1 (nm) and the depth of the phase pit is d2 (nm), phase changes $\delta$ (rad) and $\psi$ (rad) upon reflection of light by these recess and projection tracks are respectively given by:

$$\delta = \frac{2\pi}{\lambda} \, 2nd_1 \quad (1\text{-}1)$$

$$\psi = \frac{2\pi}{\lambda} \, 2nd_2 \quad (1\text{-}2)$$

where n is the refractive index of the medium, and $\lambda$ is the wavelength (nm) of the light beam. Note that equation (1-2) is practically incorrect only in case the incident beam LB1 is in a linearly polarized light state, its polarization direction (the direction of electric vector) is substantially parallel to the track, and the phase pits 6a and 6b are recessed when viewed from the direction of incidence of the beam. In this case, a correction equation below must be used.

$$\psi = \left\{ 0.6 \left( \frac{ng}{\lambda} \right) + 0.3 \right\} \frac{2\pi}{\lambda} \, 2nd_2 \quad (1\text{-}3)$$

Equation (1-3) is obtained by considering a graph shown in G. Bouwhuis, et al., "Principles of Optical Disc Systems", Adam Hilger Ltd, Bristol, (1985), pp. 101 to 104. Let p be the track pitch, and g be the mark width (the width of each of the grooves 6a and 6b formed in the projection tracks in FIG. 1C). Then, by Fourier transformation of an object structure, the 0th-order diffracted light amplitude, $K_0$, and the 1st-order diffracted light amplitude, $K_1$, are respectively given by:

$$K_0 = \int_{-p/2}^{p/2} o(x)dx \quad (1\text{-}4)$$

$$K_1 = \int_{-p/2}^{p/2} o(x)\exp[2\pi i x/p]dx \quad (1\text{-}5)$$

Note that the amplitude distribution function, $o(x)$, on the disk surface in the case of FIG. 2 or FIG. 4 is defined by:

$$o(x) = \begin{cases} \exp[i\psi] & -p/2 < x < -(p-g)/2 \\ 1 & -(p-g)/2 < x < -p/4 \\ \exp[i\delta] & -p/4 < x < p/4 \\ 1 & p/4 < x < (p-g)/2 \\ \exp[i\psi] & (p-g)/2 < x < p/2 \end{cases} \quad (1\text{-}6)$$

Therefore, the intensity, $I_1(\psi)$, of the regions 51 and 52 (regions in which the 0th-order diffracted light beam and the ±1st-order diffracted light beams interfere with each other) in FIG. 5 obtained when the marks 6a and 6b are present is given by:

$$I_1(\psi)=|K_0+K_1|^2=(A\cos\psi+B\cos\delta+C)^2+(A\sin\psi+B\sin\delta)^2 \quad (1\text{-}7)$$

On the other hand, the intensity, $I_0(\psi)$, of the region 53 (the region where only the 0th-order diffracted light beam is present) in FIG. 5 is given by:

$$I_0 = |K_0|^2 = \left( E\cos\psi + \frac{1}{2}\cos\delta + F \right)^2 + \left( E\sin\psi + \frac{1}{2}\sin\delta \right)^2 \quad (1\text{-}8)$$

for $$A = \frac{g}{p} - \frac{1}{\pi} \sin\left( \frac{g}{p}\pi \right) \quad (1\text{-}9)$$

$$B = \frac{1}{2} + \frac{1}{\pi} \quad (1\text{-}10)$$

$$C = \frac{1}{2} - \frac{g}{p} - \frac{1}{\pi} + \frac{1}{\pi} \sin\left( \frac{g}{p}\pi \right) \quad (1\text{-}11)$$

$$E = \frac{g}{p} \quad (1\text{-}12)$$

$$F = \frac{1}{2} - \frac{g}{p} \quad (1\text{-}13)$$

The intensity, $I_1(0)$, of the regions 51 and 52 (regions in which the 0th-order diffracted light beam and the ±1st-order diffracted light beams interfere with each other) and the intensity, $I_0(0)$, of the region 53 (the region where only the 0th-order diffracted light beam is present) obtained when no marks 6a and 6b are formed are given by equations below since $\psi=0$ can be set in equations (1-7) and (1-8):

$$I_1(0) = (A + B\cos\delta + C)^2 + (B\sin\delta)^2 \quad (1\text{-}14)$$

$$I_0(0) = \left( E + \frac{1}{2}\cos\delta + F \right)^2 + \left( \frac{1}{2}\sin\delta \right)^2 \quad (1\text{-}15)$$

In this case, the difference, N, between the return light amounts in the states in FIGS. 3 and 4 is given by:

$$\begin{aligned} N &= \alpha\{I_1(0) - I_1(\psi)\} + \beta\{I_0(0) - I_0(\psi)\} \\ &= (2AB\alpha + E\beta)\{\cos\delta(1 - \cos\psi) - \sin\delta\sin\psi\} + \\ &\quad 2(AC\alpha + EF\beta)(1 - \cos\psi) \end{aligned} \quad (1\text{-}16)$$

where $\alpha$ is the area of the regions 51 and 52 and $\beta$ is the area of the region 53 in FIG. 5. In equation (1-16), N clearly represents the crosstalk level from neighboring projection tracks. Therefore, if N=0 in equation (1-16), a crosstalk-free conditional formula can be obtained.

The crosstalk mixed from neighboring projection tracks to a recess track has been examined so far. Next, a case will be examined below wherein a phase pit is formed on the own track, i.e., the recess track where the laser spot is present. Provided that $$\psi = \frac{-2\pi}{\lambda} \, 2nd_3 \quad (1\text{-}2')$$

the light intensity, $J_1(\psi)$, of the regions 51 and 52, and the light intensity, $J_0(\psi)$, of the region 53 in FIG. 5 are respectively given by:

$$J_1(\psi)=|K_0-K_1|^2=(U\cos\psi+V\cos\delta+W)^2+(U\sin\psi+V\sin\delta)^2 \quad (1\text{-}17)$$

$$J_0(\psi)=I_0(\psi) \quad (1\text{-}18)$$

and the signal level, S, is given by:

$$\begin{aligned} S &= \alpha\{L_1(0) - J_1(\psi)\} + \beta\{J_0(0) - J_0(\psi)\} \\ &= (2UV\alpha + E\beta)\{\cos\beta(1 - \cos\psi) - \sin\delta\sin\psi\} + \\ &\quad 2(UW\alpha + EF\beta)(1 - \cos\psi) \end{aligned} \quad (1\text{-}19)$$

-continued for $$U = \frac{g}{p} + \frac{1}{\pi} \sin\left(\frac{g}{p}\pi\right) \quad (1\text{-}20)$$

$$V = \frac{1}{2} = \frac{1}{\pi} \quad (1\text{-}21)$$

$$W = \frac{1}{2} - \frac{g}{p} + \frac{1}{\pi} - \frac{1}{\pi} \sin\left(\frac{g}{p}\pi\right) \quad (1\text{-}22)$$

The ratio, N/S, calculated using equations (1-16) and (1-19), gives a relative crosstalk amount. In general, the relative crosstalk amount is preferably equal to or smaller than −20 dB, and the ratio preferably satisfies:

$$\left|\frac{N}{S}\right| < 0.1 \quad (1\text{-}23)$$

In the above discussions, the effect of a Gaussian beam is not taken into account. The interference effect of the ±1st-order diffracted light beams is not taken into account, either. However, even if these effects are not taken into account, equations (1-16) and (1-19) can give a signal level and a crosstalk level with sufficiently high precision.

When the reproduction beam has no track offset, the intensities of the regions 51 and 52 in FIG. 5 become equal to each other. Therefore, the −1st-order diffracted light beam need not be independently taken into consideration.

The crosstalk upon detection of optical information from a recess track has been discussed.

Crosstalk upon detection of optical information from a projection track will be examined below. In this case, since the projection/recess relationship with the neighboring tracks is reversed, the sign of δ is inverted. If pits formed on the recess and projection tracks are recess pits (or projection pits), the sign of ψ is left unchanged and only the sign of δ is inverted in equations (1-16) and (1-19). Such a case is not preferable since the value of δ which gives the crosstalk-free condition changes. In this case, if the signs of both ψ and δ are inverted, equations (1-16) and (1-19) remain unchanged consequently, and the solution of equation (1-23) can minimize both the crosstalk amounts on the projection and recess tracks. In order to realize this, the optical disk must have the following arrangement:

The tracks of the first and second groups are formed concentrically or spirally;

the tracks of the first and second groups are alternately formed to have steps between adjacent tracks in the radial direction;

relief-like pits are formed on the tracks of the first and second groups; and when a laser spot is irradiated onto the relief-like pit, the phase difference between light reflected inside the pit and light reflected outside the pit is ψ for the pits formed on the tracks of the first group, and the phase difference is −ψ+2mπ (m=0, ±1, ±2, ... ) for the pits formed on the tracks of the second group.

Alternatively, the phase difference may be given by ψ=mπ (m=±1, ±2, ... ). In this case, since the terms associated with sinδ are eliminated in equations ((1-16) and (1-19), the value of N/S has no relation to the sign of δ. Therefore, in this case as well, the solution of equation (1-23) can simultaneously minimize the crosstalk amounts on the projection and recess tracks. In order to attain this, the optical disk must have the following arrangement:

The tracks of the first and second groups are formed concentrically or spirally;

the tracks of the first and second groups are alternately formed to have steps between adjacent tracks in the radial direction;

relief-like pits are formed on the tracks of the first and second groups; and when a laser spot is irradiated onto the relief-like pit, the phase difference between light reflected inside the pit and light reflected outside the pit is ψ=mπ (m=±1, ±2, ... ).

Figure 7:
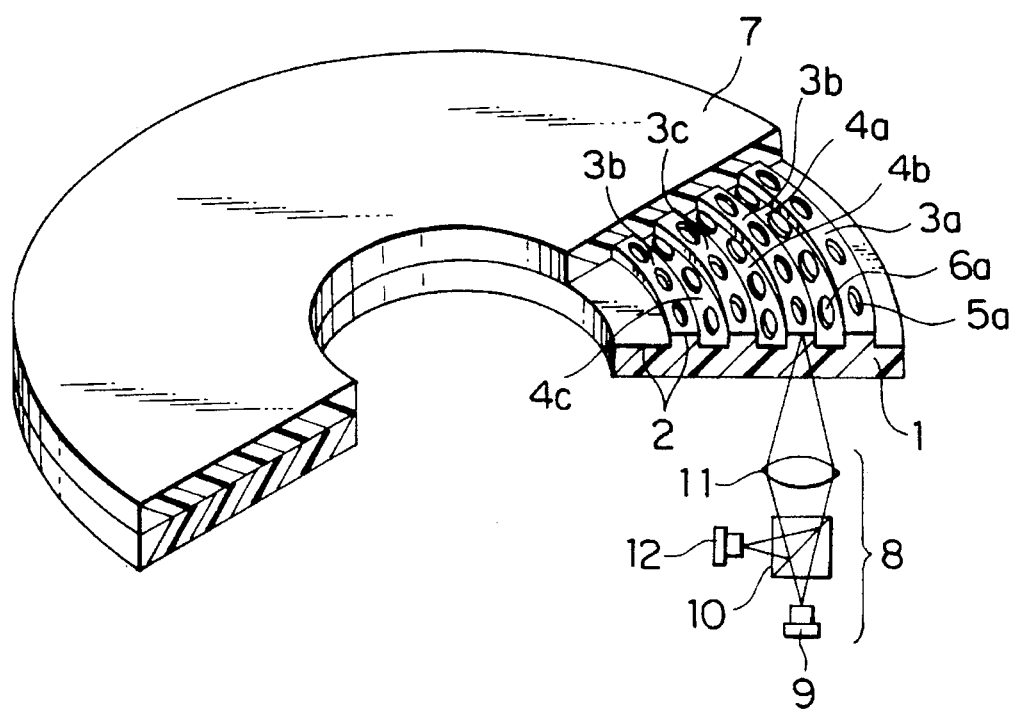
FIG. 7 is a view showing the optical disk shown in FIG. 1A and an optical system therefor.

FIG. 7 shows the optical disk which is formed to satisfy the above-mentioned conditions.

The tracks 3a to 3d of the first group and the tracks 4a to 4c of the second group form spirals. These tracks may form concentric circles.

The tracks 3a to 3d of the first group and the tracks 4a to 4c of the second group form steps in the radial direction of the optical disk. Therefore, the tracks 3a to 3d of the first group are projection tracks (lands), and the tracks 4a to 4c of the second group are recess tracks (grooves).

Relief-like pits (phase pits) or projections each for representing information are formed on the tracks 3a to 3d and 4a to 4c of the first and second groups. For example, projections 5a are formed on the bottom surface of the recess track (groove) 3a. Pits 6a are formed on the upper surface of the first projection track 4a.

The wavelength, λ, of the laser beam LB1 irradiated onto the optical disk ranges from 500 to 900 nm. The speed of light is 3×10$^8$ m/sec. ψ rad. corresponds to λψ/2π nm.

The distance, d2, between the bottom surface 400a of the pit (recess) 6a on the projection track 4a and the upper surface 40a of the projection track 4a is ψ rad. At this time, the distance, d3, between the upper surface 300a of the projection 5a on the recess track 3a and the bottom surface 30a of the recess track 3a is −ψ+2mπ rad. (for m=0, ±1, ±2, ±3, ... ; π is the ratio of circumference of circle to its diameter).

The distance d2 between the bottom surface 400a of the pit (recess) 6a on the projection track 4a and the upper surface 40a of the projection track 4a may be (2m−1)π rad. (for m=0, ±1, ±2; ±3, ... ; π is the ratio of circumference of circle to its diameter). More specifically, d2 and d3 have the same magnitude and have opposite projecting directions, so that when one information recording region is a pit, the other information recording region is an island.

In this manner, when the height and depth of the projections and pits are appropriately selected, crosstalk of information from the neighboring land tracks 4a and 4b can be minimized while the light beam LB1 is irradiated onto the track 3b and optical information from the track 3b is detected, and crosstalk of information from the neighboring groove tracks 3a and 3b can also be minimized while the light beam LB1 is irradiated onto the track 4a and optical information from the track 4a is detected. More specifically, when a laser beam having a wavelength of 780 nm and the substrate 1 having a refractive index of 1.5 are used, d1 is 159 nm, d2 is 65 nm, and d3 is −65 nm. Further, p=1600 nm, g=640 nm, and NA=0.53.

A head 8 for reproducing information recorded on the optical disk as the information recording medium has the following arrangement. The light beam LB1 emitted by a semiconductor laser 9 is transmitted through a beam splitter 10 and is focused by an objective lens 11 on a track surface 2. The reflected light (return light) reflected by the track surface 2 is transmitted through the objective lens again, and is reflected by the beam splitter 10. The light beam is then incident on a photoelectric converter (photodetector) 12 such as a photodiode. Information read out from the optical disk is reproduced on the basis of the level of an electrical signal photoelectrically converted by the photodetector 12. Note that the projection/recess relationship of the information recording regions is reversed between the two adjacent tracks, but need not be reversed as long as pits or lands having a depth or height satisfying $\psi=m\pi$ are formed. As described above, according to this embodiment, since information read out from neighboring tracks can be suppressed, the track pitch can be halved as compared to the conventional pitch while the crosstalk is suppressed. Therefore, the information recording amount can be doubled. A conventional head can be used.

A CD according to the second embodiment will be described below. The CD of the first embodiment has phase-modulated marks. However, the CD according to the second embodiment has amplitude-modulated marks.

Figure 12:
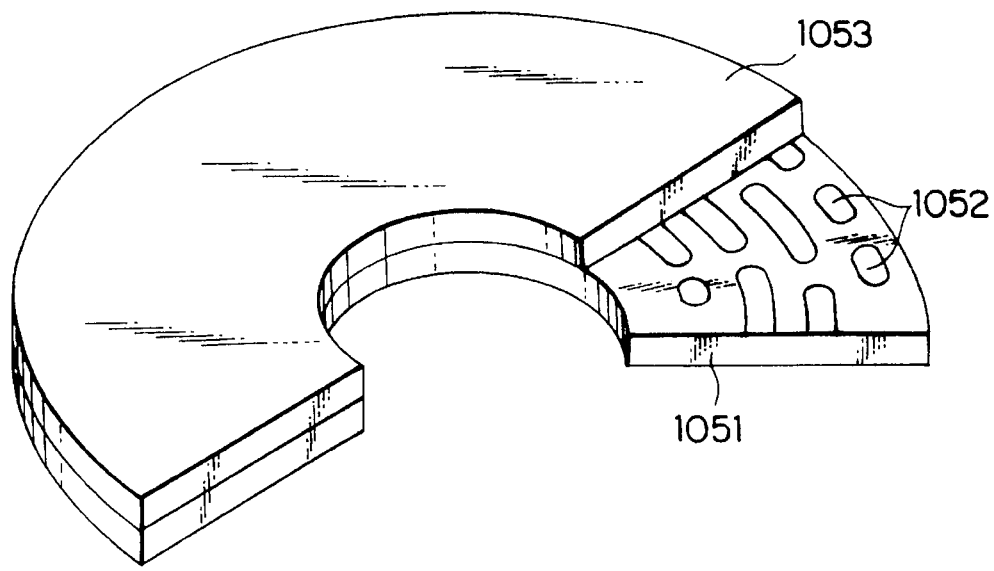
FIG. 12 is a partially cutaway perspective view showing a phase change type compact disk.

The CD having the amplitude-modulated marks will be described below. This CD is called a phase change type disk (PC disk). FIG. 12 shows a conventional PC disk. As shown in FIG. 12, the PC disk has a 1.2-mm thick transparent substrate 1051, and amplitude-modulated marks (information recording regions) 1052, which change the reflectance of light, are formed on the transparent substrate 1051. These amplitude-modulated mark arrays correspond to information tracks. Digital information is recorded on the CD in correspondence with the positions and lengths of the amplitude-modulated marks.

When recorded information is to be reproduced, the PC disk is inserted in a CD player. The CD player rotates the PC disk, and irradiates a reproduction beam from a reproduction head toward the PC disk. The size of the reproduction beam, i.e., the size of the beam spot irradiated onto the PC disk is substantially the same as that of the amplitude-modulated mark. By detecting the diffraction state of the reflected light of the light beam irradiated onto an information track, information recorded on the PC disk is reproduced.

When no amplitude-modulated mark is formed at the position of the beam spot, all the light components reflected by the information track return to the reproduction head. For this reason, an information detector incorporated in the head detects a large value.

When an amplitude-modulated mark is formed at the position of the beam spot, light components reflected by the information track are diffracted by the amplitude-modulated mark. Some light components of the reflected light components pass outside the reproduction head due to diffraction, and do not return to the reproduction head. Some other light components of the reflected light components return to the reproduction head. Therefore, the information detector incorporated in the head detects a small value.

The radius of the light beam emitted by the reproduction head can be focused to the diffraction light of the light by means of, e.g., a lens. The radius of the beam spot irradiated onto the information track can be set to be 1 μm or less. The pitch (interval) of the information tracks can be set to be 1.6 μm.

In order to increase the information amount per unit area to be stored in the CD, the pitch of the information tracks can be decreased, and the wavelength of a reproduction beam can be shortened in correspondence with the decreased pitch. However, when the pitch of the information tracks is decreased while the wavelength of the reproduction beam remains the same, i.e., the diameter of the beam spot remains the same, the beam spot is undesirably irradiated onto the phase pit on a neighboring track, and information on the neighboring track is read out.

Figure 8A:
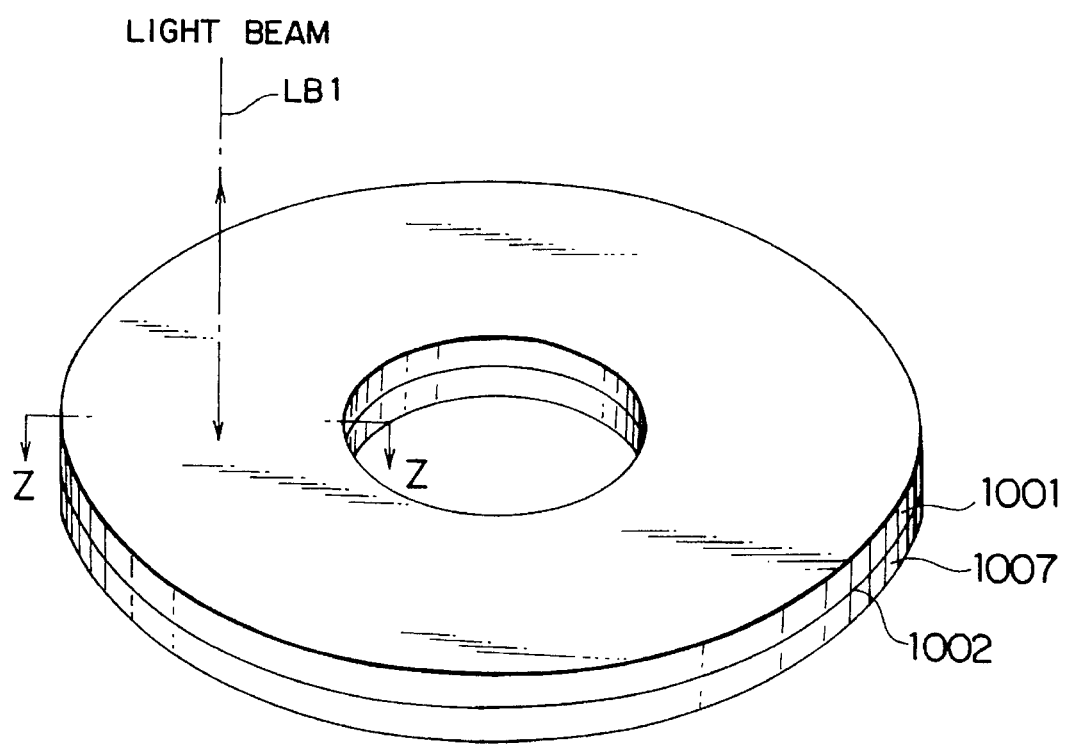
FIG. 8A is a perspective view showing an optical disk according to the second embodiment of the present invention.

FIG. 8A shows an optical disk according to the second embodiment. The optical disk comprises a substrate 1001, a protection film 1007, and an intensity modulation layer 1002 sandwiched between the substrate 1001 and the protection film 1007.

FIG. 8B is a sectional view of the optical disk shown in FIG. 8A. The substrate 1001 and the protection film 1007 consist of polycarbonate (PBT). The intensity modulation layer 1002 comprises a dielectric protection film L1, a GeSbTe recording layer L2, a dielectric protection film L3, and an Al metal reflection film L4. In a disk in which a $GeSb_2Te_4$ thin film L2 sandwiched between zinc sulfide (ZnS) protection layers L1 and L3 is formed on a resin substrate 1001, $10^5$ or more repetitive overwrite recording operations can be attained using a single laser beam which is modulated between recording power of 22 mW and erasing power of 10 mW at a linear velocity of 22 m/sec.

The optical disk comprises recess tracks 1003a to 1003d and tracks 1004a to 1004c.

Figure 8C:
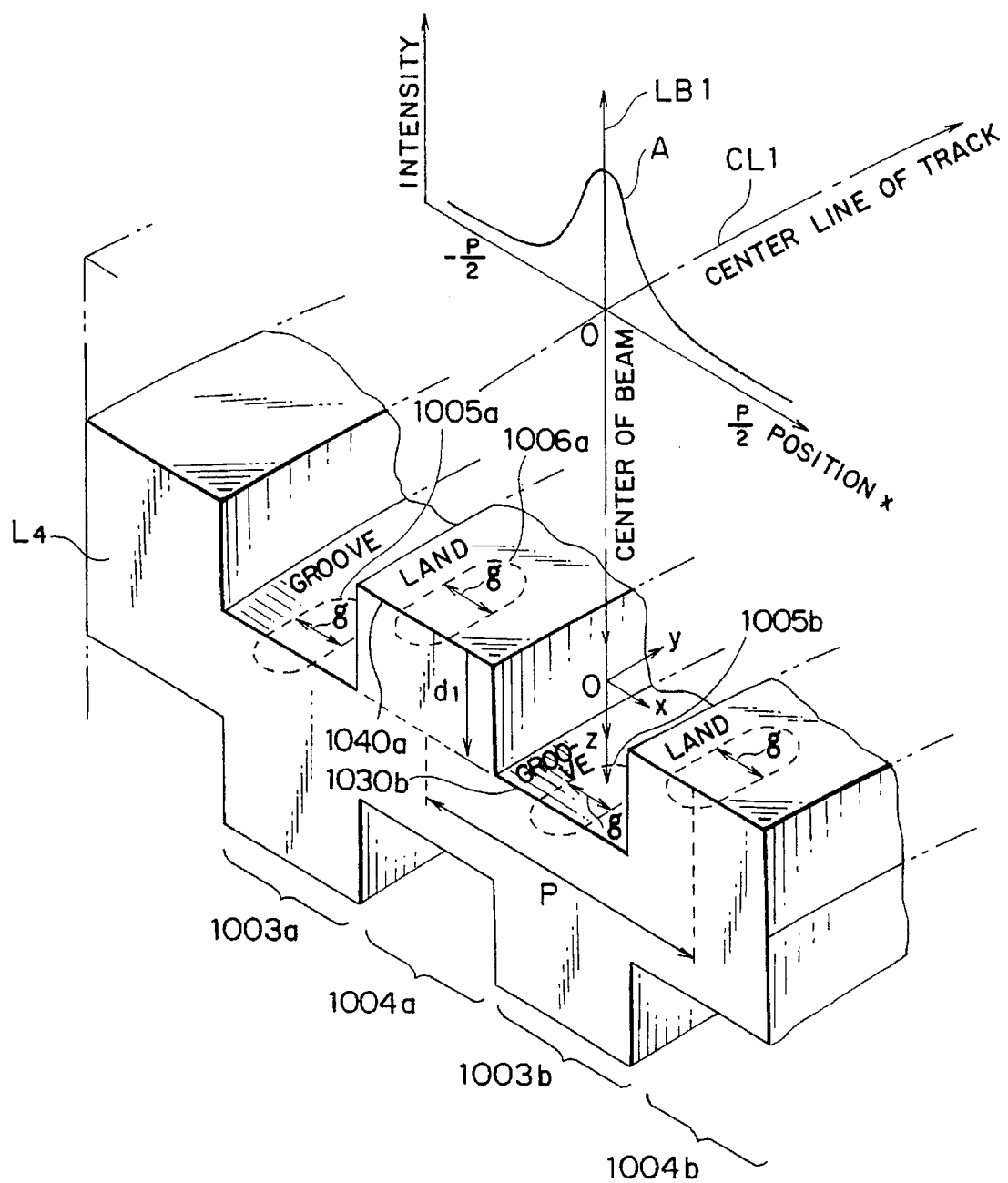
FIG. 8C is a partially cutaway perspective view for explaining the steps of the optical disk.

The structure of this optical disk will be described in more detail below with reference to FIG. 8C. FIG. 8C shows a portion of the optical disk. FIG. 8C illustrates the recess tracks 1003a and 1003b and the projection tracks 1004a and 1004b, which are formed by the aluminum layer L4. The track 1004a has a flat surface 1040a. An information recording region 1006a is a predetermined region of the recording layer L2 on the track 1004a, and the crystal state of the recording layer L2 of this region 1006a can change between the monocrystalline state and the amorphous state. Therefore, the reflectance of the recording layer L2 in the monocrystalline state is typically 30%, and the reflectance of the recording layer L2 in the amorphous state is typically 2 to 3%. The structure of the track 1004b is the same as that of the track 1004a.

The phase change recording will be described in more detail below.

In the phase change recording, information is recorded by causing a phase change (e.g., amorphous state-crystalline state, crystalline state-crystalline state, and the like) of the recording thin film, and recorded information is reproduced by detecting a change in reflectance of the recording thin film. This recording method is reversible in principle since it does not require any shape change, and information can be repetitively rewritten by reversibly causing a phase change by the laser beam irradiation condition. Such an optical disk can also be used as a write-once type disk depending on the material used. The film material includes a material containing a calcogen such as Te, Se, or the like as a major component.

In this disk, the recording thin film L2 on the substrate 1001 becomes an internal surface of the disk, thereby preventing the recording thin film L2 from deteriorating or being damaged due to direct exposure to the air. A recording/reproduction laser beam LB1 is not easily influenced by dust, scratches, and the like since it is focused on the thin film via the substrate 1001 and diverges on the outer surface of the substrate 1001.

The recording thin film L2 is sandwiched between the upper and lower protection layers L1 and L3, and the reflection layer L4 is further formed on the layer L3. Thus, a four-layered structure is used. Each protection layer consists of an organic high-melting point dielectric material, and the reflection layer consists of a metal such as Au, Al, or the like.

The tracks 1004a and 1004b are separated by the track 1003b. More specifically, the tracks 1004a and 1004b form lands, and the track 1003b forms a groove for separating these lands. The track 1003b has a flat surface 1030b corresponding to the deep portion of the groove. An information recording region 1005b on this track extends along the center line, CL1, of the track 1003b. The structure of the track 1003a is the same as that of the track 1003b.

The distance between the surface 1040a of the land 1004a and the surface 1030b of the groove 1003b is d1 (nm). The distance between a surface 1040b of the land 1004b and the surface 1030b of the groove 1003b is also d1 (nm).

The width of each of the information recording regions 1006a and 1006b is g (nm).

The distance between the centers of the information recording regions 1006a and 1006b is p (nm).

Assume that the light beam LB1 is irradiated onto the groove track 1003b. Since the information recording region 1005b is formed on the groove track 1003b, the light beam LB1 is reflected by the region 1005b. The intensity of the light beam LB1 has a Gaussian distribution along the radial direction, x, of the optical disk, as indicated by a function A in FIG. 8C.

When the light beam LB1 is irradiated onto the region 1005b, light components reflected by the regions 1006a and 1006b on the neighboring land tracks are mixed in the light components reflected by the region 1005b. Conditions for minimizing the crosstalk will be described below.

Note that this CD has the following arrangement:

the tracks of the first and second groups are formed concentrically or spirally;

the tracks of the first and second groups are alternately formed to have steps between adjacent tracks in the radial direction; and amplitude-modulated marks each having a reflectance of light different from that of a surrounding portion are formed on the tracks of the first and second groups, and elements constituting these marks satisfy relationships to be described later.

Assume that the tracks of the first group are projection-like tracks (projection tracks) 1004a and 1004b, and the tracks of the second group are recess-like tracks (recess tracks) 1003a and 1003b.

The recess tracks 1003a and 1003b are recessed tracks when viewed from the beam irradiation side, and the projection tracks 1004a and 1004b are projecting tracks when viewed from the beam irradiation side.

Figure 9:
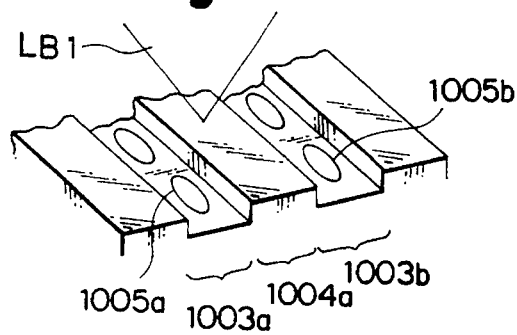
FIG. 9 is a partially enlarged view showing an optical disk which has no information recording areas on lands.

A case will be examined below wherein no signals are recorded on the projection track 1004a (no amplitude-modulated marks 1006a are formed), and signals are recorded on the neighboring recess tracks 1003a and 1003b (amplitude-modulated marks 1006a are formed). FIG. 9 shows this state. Referring to FIG. 9, a reproduction beam LB1 is irradiated from the above onto the center of the recess track.

Figure 10A:
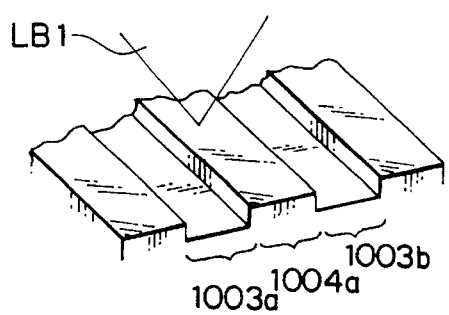
FIG. 10A is a partially enlarged view showing an optical disk which has no information recording areas on grooves and lands.
Figure 10B:
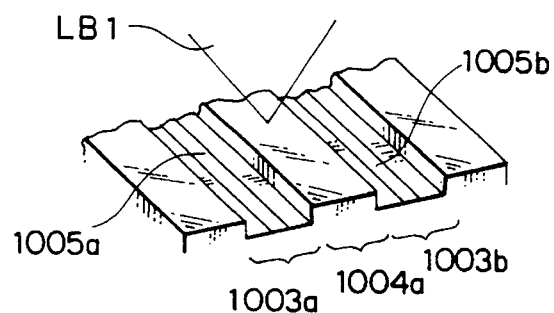
FIG. 10B is a partially enlarged view showing an optical disk which has information recording areas on only grooves.

Assuming that the length, in the track direction, of the amplitude-modulated marks 1005a and 1005b shown in FIG. 9 is sufficiently larger than the reproduction beam size (spot diameter), the intensity modulation amount, N, of return light (reflected light) by the marks on the neighboring tracks is equal to the difference between the return light amount in the states illustrated in FIGS. 10A and 10B.

Figure 11:
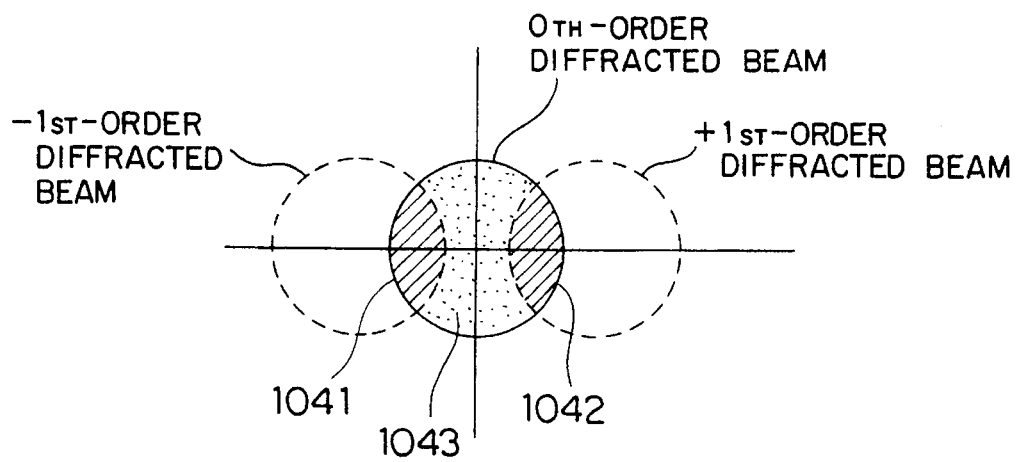
FIG. 11 is a view showing the diffraction pattern of a light beam reflected by the optical disk.

On the other hand, light reflected and diffracted by the disk surface (reflection film L4) returns to the objective lens again, and forms a diffraction pattern shown in FIG. 11. In FIG. 11, regions 1041 and 1042 are those in which the 0th-order diffracted light beam and the ±1st-order diffracted light beams interfere with each other. A region 1043 is one where only the 0th-order diffracted light beam is present. The return light amount is obtained by adding the light intensities on the regions 1041, 1042, and 1043.

Let d1 be the step between the projection and recess tracks, r be the light reflectance inside the amplitude-modulated mark, and 1 be the light reflectance outside the mark. The r is defined by following equation r=R1/R2, where R1 is the amplitude reflectance of the light beam reflected by the information recording region, and R2 is the amplitude reflectance of the remaining region in the groove track. Then, the phase change, $\delta$, upon reflection of light by the track step is given by:

$$\delta = \frac{2\pi}{\lambda} 2nd_1 \quad (2\text{-}1)$$

where n is the refractive index of a medium, and $\lambda$ is the wavelength of the light beam. Let p be the track pitch, and g be the mark width (the width of the amorphous region formed in the recess track shown in FIG. 10B). Then, by Fourier transformation of an object structure, the 0th-order diffracted light amplitude, $K_0$, and the 1st-order diffracted light amplitude, $K_1$, in FIG. 8C are respectively given by:

$$K_0 = \int_{-p/2}^{p/2} o(x)dx \quad (2\text{-}2)$$

$$K_1 = \int_{-p/2}^{p/2} o(x)\exp[2\pi ix/p]dx \quad (2\text{-}3)$$

Note that the amplitude distribution function, o(x) of the disk surface in FIG. 9 or 10B is given by:

$$o(x) = \begin{cases} r & -p/2 < x < -(p-g)/2 \\ 1 & -(p-g)/2 < x < -p/4 \\ \exp[i\delta] & -p/4 < x < p/4 \\ 1 & p/4 < x < (p-g)/2 \\ r & (p-g)/2 < x < p/2 \end{cases} \quad (2\text{-}4)$$

Therefore, the intensity, $I_1(r)$, of the regions 1041 and 1042 (the regions in which the 0th-order diffracted light beam and the ±1st-order diffracted light beams interfere with each other) in FIG. 11 obtained when marks are formed is given by:

$$I_1(r) = |K_0 + K_1|^2 = (Ar + B\cos\delta + C)^2 + (B\sin\delta)^2 \quad (2\text{-}5)$$

On the other hand, the intensity, $I_0(r)$, of the region 1043 (the region where only the 0th-order diffracted light beam is present) in FIG. 11 is given by:

$$I_0 = |K_0|^2 = \left(Er + \frac{1}{2}\cos\delta + F\right)^2 + \left(\frac{1}{2}\sin\delta\right)^2 \quad (2\text{-}6)$$

for $$A = \frac{g}{p} - \frac{1}{\pi}\sin\left(\frac{g}{p}\pi\right) \quad (2\text{-}7)$$

$$B = \frac{1}{2} + \frac{1}{\pi} \quad (2\text{-}8)$$

$$C = \frac{1}{2} - \frac{g}{p} - \frac{1}{\pi} + \frac{1}{\pi}\sin\left(\frac{g}{p}\pi\right) \quad (2\text{-}9)$$

$$E = \frac{g}{p} \quad (2\text{-}10)$$

$$F = \frac{1}{2} - \frac{g}{p} \quad (2\text{-}11)$$

The intensity, $I_1(0)$, of the regions 1041 and 1042 (the regions in which the 0th-order diffracted light beam and the ±1st-order diffracted light beams interfere with each other) in FIG. 11 and the intensity, $I_0(0)$, of the region 1043 (the region where only the 0th-order diffracted light beam is present) obtained when no marks are formed are given by equations below since r=0 can be set in equations (2-5) and (2-6):

$$I_1(O) = (A + B\cos\delta + C)^2 + (B\sin\delta)^2 \quad (2\text{-}12)$$

$$I_0(O) = (E + \tfrac{1}{2}\cos\delta + F)^2 + (\tfrac{1}{2}\sin\delta)^2 \quad (2\text{-}13)$$

In this case, the difference, N, between the return light amounts in the states in FIGS. 10A and 10B is given by:

$$\begin{aligned} N &= \alpha\{I_1(0) - I_1(r)\} + \beta\{I_0(0) - I_0(r)\} \\ &= (A^2\alpha + E^2\beta)(1 - r^2) + 2(AB\alpha + E\beta)(1 - r)\cos\delta + \\ &\quad (AC\alpha + EF\beta)(1 - r) \end{aligned} \quad (2\text{-}14)$$

where α is the area of the regions 1041 and 1042 and β is the area of the region 1043 in FIG. 11. In equation (2-14), N clearly represents the crosstalk level from the neighboring recess tracks. Therefore, if N=0 in equation (2-14), a crosstalk-free conditional formula can be obtained.

The crosstalk mixed from neighboring recess tracks to a projection track has been examined so far. Next, a case will be examined below wherein an amplitude-modulated mark is formed on the own track, i.e., the projection track where the laser spot is present. In this case, the light intensity, $J_1(r)$, of the regions 1041 and 1042, and the light intensity, $J_0(r)$, of the region 1043 in FIG. 11 are respectively given by:

$$J_1(r) = |K_0 - K_1|^2 = (Ur + V\cos\delta + W)^2 + (V\sin\delta)^2 \quad (2\text{-}15)$$

$$J_0(r) = I_0(r) \quad (2\text{-}16)$$

and the signal level, S, is given by:

$$\begin{aligned} S &= \alpha\{J_1(0) - J_1(r)\} + \beta\{J_0(0) - J_0(r)\} \\ &= (U^2\alpha + E^2\beta)(1 - r^2)2(UV\alpha + E\beta)(1 - r)\cos\delta + \\ &\quad 2(UW\alpha + EF\beta)(1 - r) \end{aligned} \quad (2\text{-}17)$$

for $$U = \frac{g}{p} + \frac{1}{\pi}\sin\left(\frac{g}{p}\pi\right) \quad (2\text{-}18)$$

$$V = \frac{1}{2} - \frac{1}{\pi} \quad (2\text{-}19)$$

$$W = \frac{1}{2} - \frac{g}{p} + \frac{1}{\pi} - \frac{1}{\pi}\sin\left(\frac{g}{p}\pi\right) \quad (2\text{-}20)$$

The ratio, N/S, calculated using equations (2-14) and (2-17), gives a relative crosstalk amount. In general, the relative crosstalk amount is preferably equal to or smaller than −20 dB, and the ratio preferably satisfies:

$$\left|\frac{N}{S}\right| < 0.1 \quad (2\text{-}21)$$

In the above discussions, the effect of a Gaussian beam is not taken into account. The interference effect of the ±1st-order diffracted light beams is not taken into account, either. However, even if these effects are not taken into account, equations (2-14) and (2-14) can give a signal level and a crosstalk level with sufficiently high precision.

when the reproduction beam has no track offset, the intensities of the regions 1041 and 1042 in FIG. 11 become equal to each other. Therefore, the −1st-order diffracted light beam need not be independently taken into consideration. The crosstalk upon detection of optical information from a projection track has been discussed.

Crosstalk upon detection of optical information from a recess track will be examined below. In this case, since the projection/recess relationship with the neighboring tracks is reversed, the sign of δ is inverted. However, since the variable δ appears only in the form of cosδ in equations (2-14) and (2-17), the crosstalk-free condition given by equation (2-21) remains the same even when the sign of δ is inverted. Therefore, the solution of equation (2-21) can simultaneously minimize the crosstalk amounts on the projection and recess tracks.

The above discussions have been made in consideration of the amplitude-modulation type optical disk. However, the effect of the present invention is also effective for a magnetooptical disk using a polar Kerr effect. If the complex Kerr rotation angle is given by $\theta = \theta r + i_\chi$, reflected light can be converted into linearly polarized light by inserting a phase plate having a phase difference of $\Phi = \arctan(\chi/\theta r)$ into the reproduction optical system, and if a symmetrical differential method is assumed in this case, a magnetooptical mark can be handled as an amplitude-modulated mark given by an equation below after passing through an analyzer:

$$r = \begin{cases} 1 + |\theta| & \text{within mark area} \\ 1 - |\theta| & \text{otherwise} \end{cases} \quad (2\text{-}22)$$

Figure 13:
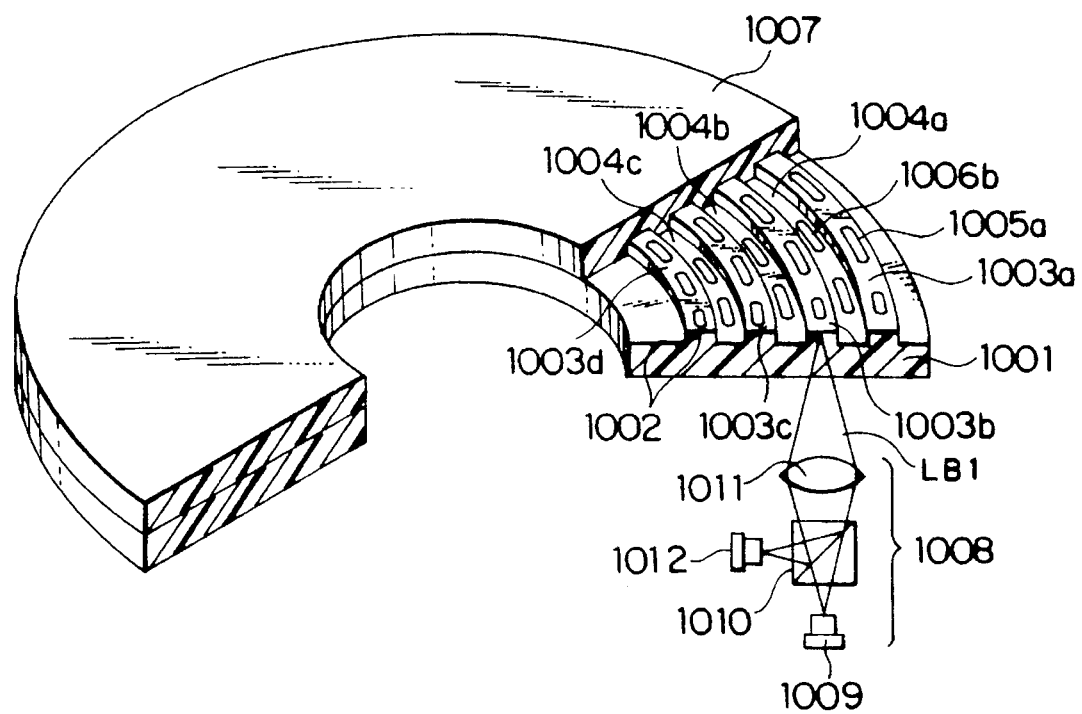
FIG. 13 is a view showing the optical disk shown in FIG. 8A and an optical system therefor.

FIG. 13 shows the optical disk which is formed to satisfy the above-mentioned conditions.

The tracks 1003a to 1003d of the first group and the tracks 1004a to 1004c of the second group respectively form spirals. These tracks may form concentric circles.

The tracks 1003a to 1003d of the first group and the tracks 1004a to 1004c of the second group form steps in the radial direction of the optical disk. Therefore, the tracks 1003a to 1003d of the first group are projection tracks (lands), and the tracks 1004a to 1004c of the second group are recess tracks (grooves).

The regions 1005a to 1005d and 1006a to 1006c each for representing information are formed on the tracks 1003a to 1003d and 1004a to 1004c of the first and second groups. Each of these regions comprises an intensity modulation layer 1002 consisting of a phase change thin film (recording layer) L2 which can change between the monocrystalline state and the amorphous state. The modulation layer 1002 is interposed between the substrate 1001 and the protection layer 1007. Depending on whether the recording layer L2 is in the amorphous, monocrystalline, or polycrystalline state, the reflectance of light irradiated onto the modulation layer 1002 changes. For this reason, information recorded on each track can be read out by measuring the reflectance of the light.

A head 1008 for reproducing information recorded on the optical disk as the information recording medium has the following arrangement.

A light beam LB1 emitted by a semiconductor laser 1009 is transmitted through a beam splitter 1010, and is incident on an objective lens 1011. The light beam LB1 is focused by the objective lens 1011 on the track surface as the surface of the modulation layer 1002. The reflected light (return light) reflected by the track surface is transmitted through the objective lens 1011 again, and is reflected by the beam splitter 1010. The light is then detected by a photoelectric converter (photodetector) 1012 such as a photodiode. Information written in the optical disk can be reproduced by detecting the level of an electrical signal photoelectrically converted by the photodetector 1012.

The reflectance of the regions 1005a to 1005d and 1006a to 1006c, the step between adjacent tracks, the track pitch p, the mark width g, the wavelength of the semiconductor laser 1009, and the numerical aperture, NA, of the objective lens in FIG. 13 are determined to satisfy equation (2-21). Therefore, signal reproduction can be satisfactorily performed while eliminating crosstalk.

More specifically, the wavelength, λ, of the laser beam LB1 irradiated onto the optical disk is 780 nm. The speed of light is $3\times10^8$ m/sec. $\psi$ rad. corresponds to $\lambda\psi/2\pi$ nm. When the refractive index of the substrate is 1.5, the step d1 is 82 nm, and the reflectance r is 0.5, further, p=1600 nm, g=640 nm, and NA=0.53, the crosstalk amount is minimized.

When d1 and r are set in this manner, crosstalk of information from the neighboring land tracks 1004a and 1004b can be minimized when the light beam LB1 is irradiated onto the track 1003b and optical information from the track 1003b is detected, and crosstalk of information from the neighboring groove tracks 1003a and 1003b can be minimized when the light beam LB1 is irradiated onto the track 1004a and optical information from the track 1004a is detected.

As described above, in the optical disk of this embodiment as well, since information read out from the neighboring tracks can be suppressed, the track pitch can be substantially halved as compared to the conventional pitch. Therefore, as compared to a conventional recording medium, the recording density can be doubled, i.e., the information recording amount per unit area can be doubled. A conventional head can be used.

An optical disk according to the third embodiment will be described below.

Figure 14A:
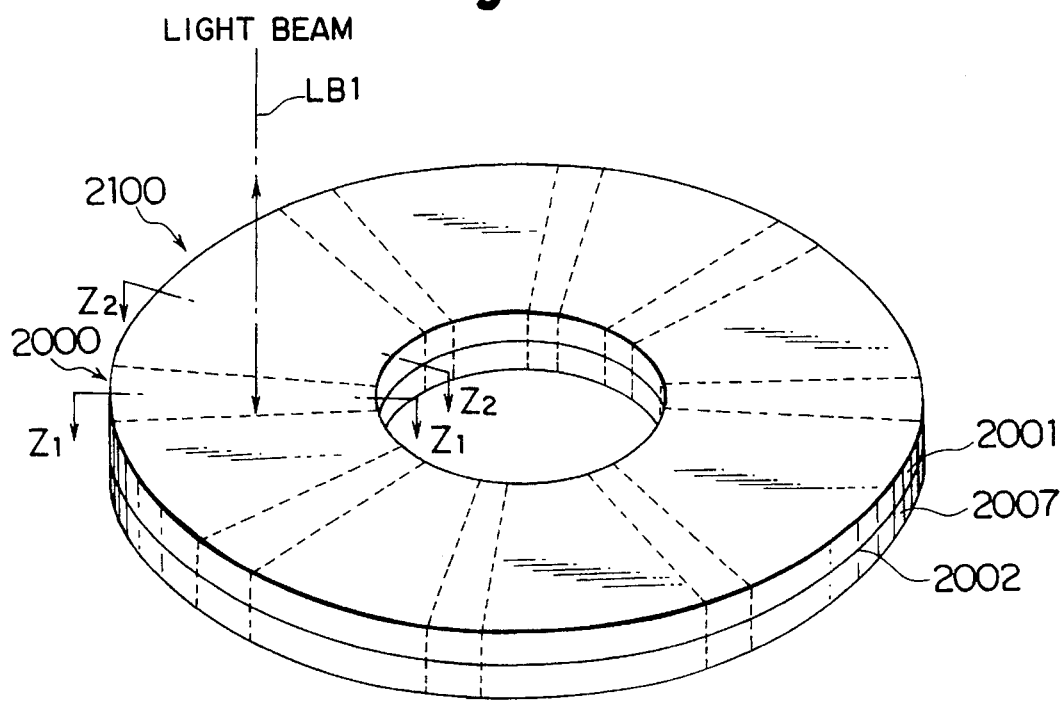
FIG. 14A is a perspective view showing an optical disk according to the third embodiment of the present invention.
Figure 14B:
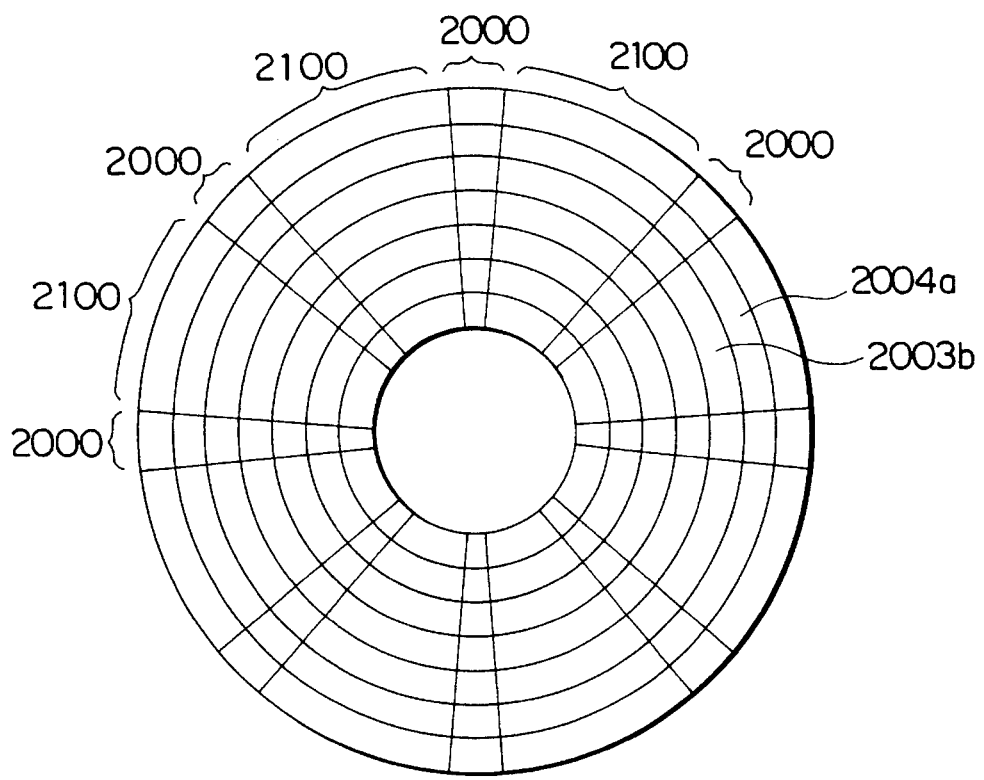
FIG. 14B is a plan view showing write-once regions and erasable regions of the tracks on the optical disk.

FIGS. 14A and 14B show an optical disk. On each of information tracks 2003a to 2003d and 2004a to 2004c, pre-mark portions 2000 and rewrite portions 2100 are alternately formed in the circumferential direction. Address information is recorded in advance in each pre-mark portion (write-only region) 2000, and arbitrary code information can be recorded in each rewrite portion (erasable region) 2100. The tracks of this optical disk are alternately formed in the radial direction, but may be formed spirally.

Since relief-like phase marks 2005a to 2005d are formed on the pre-mark portions 2000, the amplitude of light reflected by each phase mark is modulated due to the diffraction effect of light by the phase mark. Therefore, upon irradiation of a light beam LB1 onto each pre-mark region 2000, address information can be reproduced.

A phase change type recording thin film is formed on each rewrite portion 2100. The phase change type recording thin film can arbitrarily generate a high-reflectance state and a low-reflectance state. The reflectance of amplitude-modulated marks 2005a to 2005d and 2006a to 2006c is lower than the reflectance of regions other than the marks 2006 in the corresponding tracks. Therefore, upon irradiation of the light beam onto each rewrite portion 2100, code information can be reproduced.

Upon detection of the code information, the light beam LB1 is irradiated onto the pre-mark portion 2000 to detect address information, and the position of the rewrite portion 2100 of the track where predetermined code information is recorded is specified on the basis of the detected address information. By irradiating the light beam LB1 onto the specified rewrite portion 2100, code information is reproduced.

The arrangement of a reproduction head can be the same as that shown in FIG. 13. In this case, the wavelength $\lambda$ of the light beam LB1 is $\lambda=0.83$ μm, the numerical aperture NA of a lens of the head is NA=0.55, the pitch of the tracks is 1.6 μm, the pit width of each phase mark is 0.3 μm, the relative reflectance of each amplitude mark is 0.4, the width of the amplitude-modulated mark is 0.7 μm, and the phase difference $\psi$ caused by the phase mark is $\psi=113°$. These values satisfy equations (1-23) and (2-21).

The reason why the address information and the code information are recorded in different formats is that the phase marks and the guide grooves can be defined by a three-dimensional structure, and the three-dimensional structure can be easily manufactured using a stamp method.

Figure 14C:
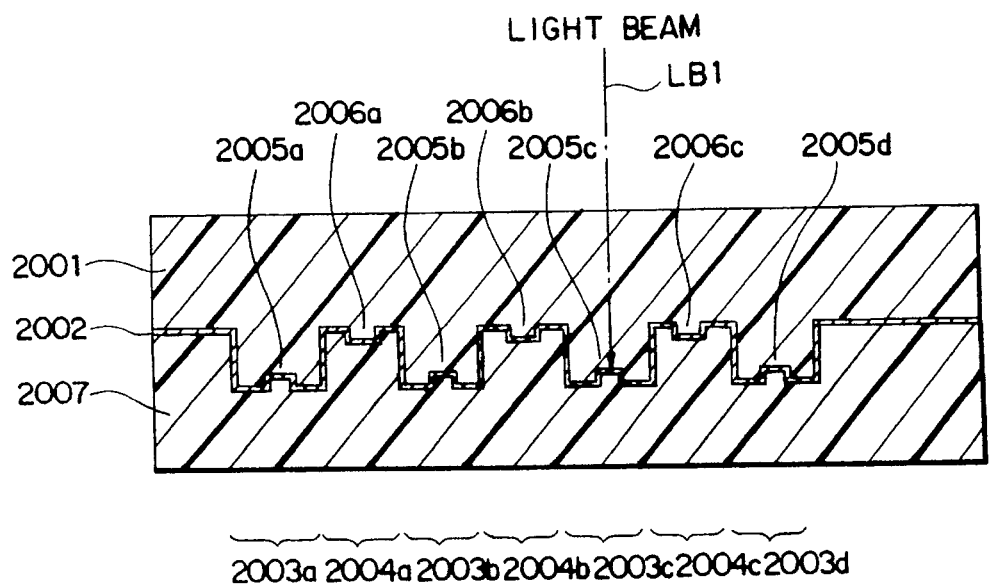
FIG. 14C is a sectional view of the optical disk shown in FIG. 14A taken along arrows Z1—Z1 in FIG. 14A.
Figure 14D:
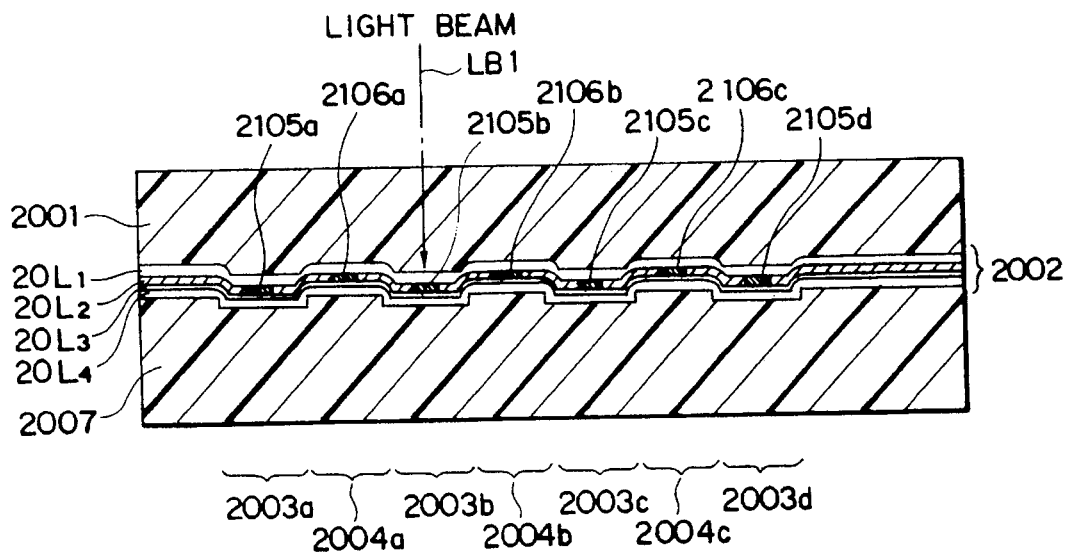
FIG. 14D is a sectional view of the optical disk shown in FIG. 14A taken along arrows Z2—Z2 in FIG. 14A.
Figure 15:
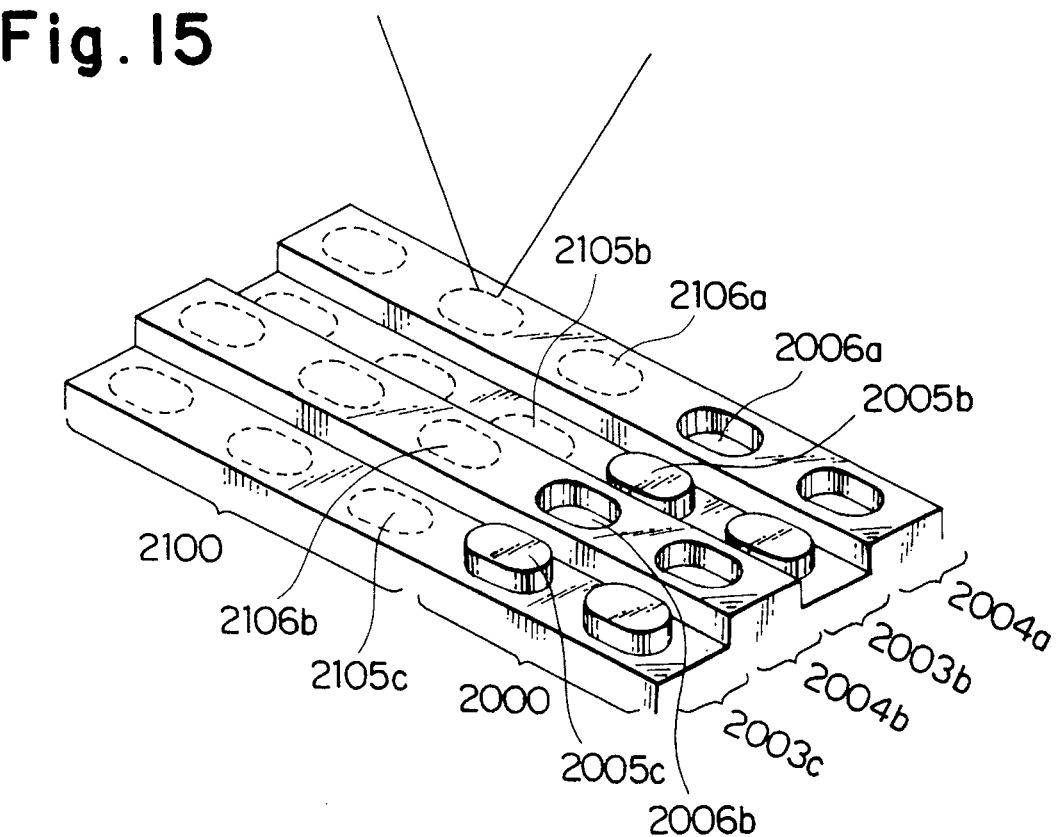
FIG. 15 is a partially enlarged view of the optical disk.

The optical disk of this embodiment has a structure shown in FIGS. 14C and 14D and FIG. 15 to eliminate crosstalk from neighboring tracks.

FIG. 14C is a sectional view of the optical disk taken along arrows Z1—Z1 in FIG. 14A, and FIG. 14D is a sectional view of the optical disk taken along arrows Z2—Z2 in FIG. 14A. Note that FIG. 15 is an enlarged view of principal part of the optical disk.

Note that the structure shown in FIG. 14C is the same as that shown in FIG. 1B, and the structure shown in FIG. 14D is the same as that shown in FIG. 8B.

In FIG. 14C, an element 2001 is the same as the element 1;

an element 2002 is the same as the element 2;

elements 2003a to 2003d are the same as the elements 3a to 3d;

elements 2004a to 2004c are the same as the elements 4a to 4c;

elements 2005a to 2005d are the same as the elements 5a to 5d;

elements 2006a to 2006c are the same as the elements 6a to 6c; and an element 2007 is the same as the element 7.

In FIG. 14D, an element 2001 is the same as the element 1001;

an element 2002 is the same as the element 1002;

elements 2003a to 2003d are the same as the elements 1003a to 1003d;

elements 2004a to 2004c are the same as the elements 1004a to 1004c;

elements 2105a to 2105d are the same as the elements 1005a to 1005d;

elements 2106a to 2106c are the same as the elements 1006a to 1006c; and elements $20L_1$ to $20L_4$ are the same as the elements L1 to L4.

Therefore, optimal values for minimizing crosstalk among these elements need only satisfy equations (1-23) and (2-21) above.

Figure 16:
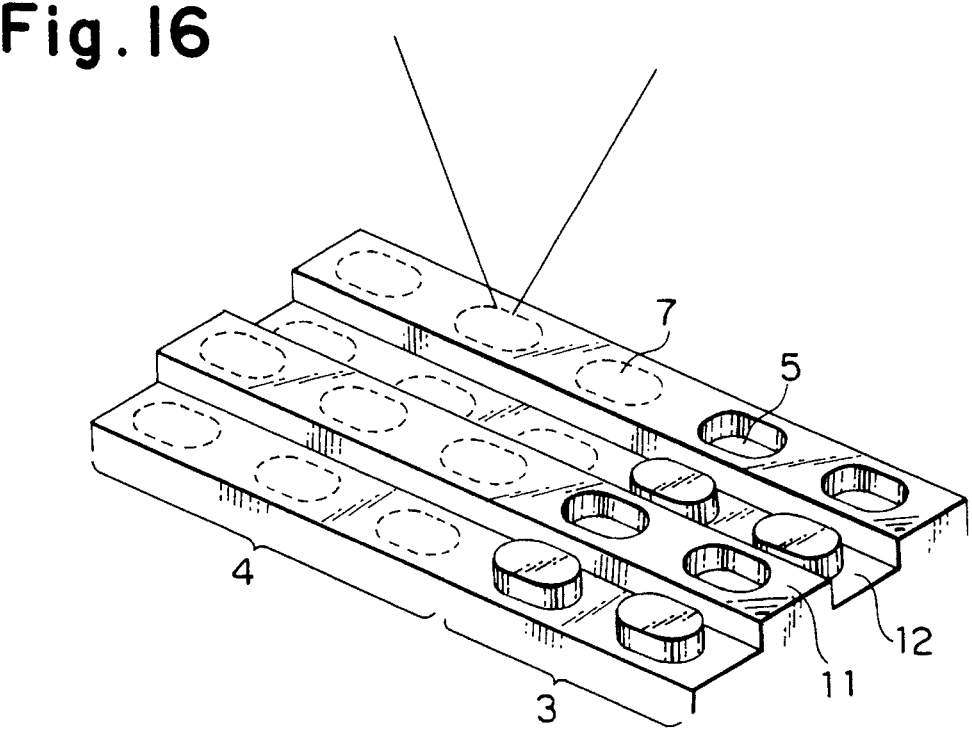
FIG. 16 is a partially enlarged view of an optical disk using magnetooptical marks.

Alternatively, as shown in FIG. 16, the rewrite portions 2100 may use magnetooptical marks.

The present invention is not limited to amplitude modulation like in a phase change recording medium but may be applied to a medium utilizing the Kerr rotation effect like in a magnetooptical medium. From the invention thus described, it will be obvious that the invention may be varied in many ways. Such variations are not to be regarded as a departure from the spirit and scope of the invention, and all such modifications as would be obvious to one skilled in the art are intended for inclusion within the scope of the following claims.

The basic Japanese Application Nos. 190695/1994 (6-190695) filed on Aug. 12, 1994, 215137/1994 (6-215137) filed on Sep. 9, 1994, and 215138/1994 (6-215138) filed on Sep. 9, 1994 are hereby incorporated by reference.

What is claimed is:

1. An optical disk from which recorded information is read out by irradiating a light beam onto said optical disk, comprising:

(a) neighboring land tracks, on which pits each having a predetermined depth are formed; and (b) a groove track for separating said land tracks, islands each having a predetermined height being formed on said groove track, wherein the depth, D, of the pits and the height, H, of the islands satisfy:

$$D = H + m\lambda/2n$$

where, m is an integer and $\lambda$ is the wavelength of the light beam; and n is the refractive index of the medium.

2. An optical disk according to claim 1, wherein the wavelength $\lambda$ is larger than 400 nm and smaller than 900 nm.

3. An optical disk according to claim 1, said optical disk satisfying:

$$\left| \frac{N}{S} \right| < 0.1$$

$$N = (2AB\alpha + E\beta)\{\cos\delta(1 - \cos\psi) - \sin\delta\sin\psi\} + 2(AC\alpha + EF\beta)(1 - \cos\psi)$$

$$S = (2UV\alpha + E\beta)\{\cos\delta(1 - \cos\psi) - \sin\delta\sin\psi\} + 2(UW\alpha + EF\beta)(1 - \cos\psi)$$

$$A = \frac{g}{p} - \frac{1}{\pi} \sin\left(\frac{g}{p}\pi\right)$$

$$B = \frac{1}{2} + \frac{1}{\pi}$$

$$C = \frac{1}{2} - \frac{g}{p} - \frac{1}{\pi} + \frac{1}{\pi} \sin\left(\frac{g}{p}\pi\right)$$

$$E = \frac{g}{p}$$

$$F = \frac{1}{2} - \frac{g}{p}$$

$$U = \frac{g}{p} + \frac{1}{\pi} \sin\left(\frac{g}{p}\pi\right)$$

$$V = \frac{1}{2} - \frac{1}{\pi}$$

$$W = \frac{1}{2} - \frac{g}{p} + \frac{1}{\pi} - \frac{1}{\pi} \sin\left(\frac{g}{p}\pi\right)$$

$$\delta = \frac{2\pi}{\lambda} 2nd_1$$

$$\psi = \frac{2\pi}{\lambda} 2nd_2$$

where, d1 is the depth (nm) of said groove track;

d2 is the depth (nm) of said pit;

$\lambda$ is the wavelength of the light beam;

$\pi$ is the ratio of circumference of circle to its diameter;

g is the width of the information recording region;

p is the distance between central lines of said land tracks;

$\alpha$ is the area of a region in which 0th-order diffracted light and ±1st-order diffracted light interfere with each other, in a far field diffraction pattern of the reflected light of the light beam irradiated onto said groove track; and $\beta$ is the area of a region where only the 0th-order diffracted light is present, in the far field diffraction pattern of the reflected light of the light beam irradiated onto said groove track.

4. An optical disk according to claim 3, wherein the wavelength $\lambda$ is larger than 400 nm and smaller than 900 nm.

5. An optical disk from which recorded information is read out by irradiating a light beam onto said optical disk, comprising:

(a) neighboring land tracks, on which information recording regions from which information is read out upon irradiation of the light beam thereon are formed; and (b) a groove track for separating said land tracks, islands each having a predetermined height being formed on said groove track, wherein the height, H, of the islands satisfies:

$$H = (2m-1)\lambda/4n$$

where, m is an integer and $\lambda$ is the wavelength of the light beam; and n is the refractive index of the medium.

6. An optical disk according to claim 5, wherein the wavelength $\lambda$ is larger than 400 nm and smaller than 900 nm.

7. An optical disk from which recorded information is read out by irradiating a light beam onto said optical disk, comprising:

(a) neighboring land tracks, on which information recording regions, each of which modulates an intensity of reflected light of the light beam upon irradiation of the light beam thereon via a substrate, are formed; and (b) a groove track for separating said land tracks, information recording regions, each of which modulates an intensity of reflected light of the light beam upon irradiation of the light beam thereon via a substrate, being formed on said groove track, said optical disk satisfying:

$$r = R1/R2$$

$$\delta = 4\pi nD/\lambda$$

$$N = (A^2\alpha + E^2\beta)(1 - r^2) + 2(AB\alpha + E\beta)(1 - r)\cos\delta + 2(AC\alpha + EF\beta)(1 - r)$$

$$S = (U^2\alpha + E^2\beta)(1 - r^2) + 2(UV\alpha + E\beta)(1 - r)\cos\delta + 2(UW\alpha + EF\beta)(1 - r)$$

$$A = \frac{g}{p} - \frac{1}{\pi} \sin\left(\frac{g}{p}\pi\right)$$

$$B = \frac{1}{2} + \frac{1}{\pi}$$

$$C = \frac{1}{2} - \frac{g}{p} - \frac{1}{\pi} + \frac{1}{\pi} \sin\left(\frac{g}{p}\pi\right)$$

$$E = \frac{g}{p}$$

$$F = \frac{1}{2} - \frac{g}{p}$$

$$U = \frac{g}{p} + \frac{1}{\pi} \sin\left(\frac{g}{p}\pi\right)$$

$$V = \frac{1}{2} - \frac{1}{\pi}$$

$$W = \frac{1}{2} - \frac{g}{p} + \frac{1}{\pi} - \frac{1}{\pi} \sin\left(\frac{g}{p}\pi\right)$$

$$\left| \frac{N}{S} \right| < 0.1$$

where

R1 is the amplitude reflectance of the light beam reflected by the information recording region;

R2 is the amplitude reflectance of the remaining region in said groove track;

D is the depth of said groove track;

n is the refractive index of the substrate;

λ is the wavelength of the light beam;

π is the ratio of circumference of circle to its diameter;

g is the width of the information recording region;

p is the distance between central lines of said land tracks;

α is the area of a region in which 0th-order diffracted light and ±1st-order diffracted light interfere with each other, in a far field diffraction pattern of the reflected light of the light beam irradiated onto said groove track; and β is the area of a region where only the 0th-order diffracted light is present, in the far field diffraction pattern of the reflected light of the light beam irradiated onto said groove track.

8. An optical disk according to claim 7, wherein the wavelength λ is larger than 400 nm and smaller than 900 nm.

9. An optical disk according to claim 7, wherein each of the information recording regions includes a GeSbTe layer.

10. An optical disk according to claim 7, further comprising:

pits formed on predetermined regions of said land tracks;

islands formed on predetermined regions of said groove track.

11. An optical disk from which recorded information is read out by irradiating a light beam onto said optical disk, comprising:

(a) neighboring land tracks, wherein pits each having a predetermined depth are formed on said land tracks, and wherein information recording regions each of which modulates an intensity of reflected light of the light beam upon irradiation of the light beam thereon via a substrate are formed; and (b) a groove track for separating said land tracks, wherein islands each having a predetermined height are formed on said groove track, and an information recording regions each of which modulates an intensity of reflected light of the light beam upon irradiation of the light beam thereon via a substrate are formed on said groove track, wherein said optical disk satisfying:

$r = R1/R2$ $\delta = 4\pi nD/\lambda$ $Na = (A^2\alpha + E^2\beta)(1 - r^2) + 2(AB\alpha + E\beta)(1 - r)\cos\delta + 2(AC\alpha + EF\beta)(1 - r)$ $Sa = (U^2\alpha + E^2\beta)(1 - r^2) + 2(UV\alpha + E\beta)(1 - r)\cos\delta + 2(UW\alpha + EF\beta)(1 - r)$ $A = \frac{g}{p} - \frac{1}{\pi} \sin\left(\frac{g}{p}\pi\right)$ $B = \frac{1}{2} + \frac{1}{\pi}$ $C = \frac{1}{2} - \frac{g}{p} - \frac{1}{\pi} + \frac{1}{\pi} \sin\left(\frac{g}{p}\pi\right)$ $E = \frac{g}{p}$ $F = \frac{1}{2} - \frac{g}{p}$ $U = \frac{g}{p} + \frac{1}{\pi} \sin\left(\frac{g}{p}\pi\right)$ $V = \frac{1}{2} - \frac{1}{\pi}$ $W = \frac{1}{2} - \frac{g}{p} + \frac{1}{\pi} - \frac{1}{\pi} \sin\left(\frac{g}{p}\pi\right)$ $\left|\frac{Na}{Sa}\right| < 0.1$ $Np = (2AB\alpha + E\beta)\{\cos\delta(1 - \cos\psi) - \sin\delta\sin\psi\} + 2(AC\alpha + EF\beta)(1 - \cos\psi)$ $Sp = (2UV\alpha + E\beta)\{\cos\delta(1 - \cos\psi) - \sin\delta\sin\psi\} + 2(UW\alpha + EF\beta)(1 - \cos\psi)$ $\psi = \frac{2\pi}{\lambda} 2nd_2$ $\left|\frac{Np}{Sp}\right| < 0.1$ where, R1 is the amplitude reflectance of the light beam reflected by the information recording region;

R2 is the amplitude reflectance of the remaining region in said groove track;

D is the depth of said groove track;

n is the refractive index of the substrate;

λ is the wavelength of the light beam;

π is the ratio of circumference of circle to its diameter;

g is the width of the information recording region;

p is the distance between central lines of said land tracks;

α is the area of a region in which 0th-order diffracted light and ±1st-order diffracted light interfere with each other, in a far field diffraction pattern of the reflected light of the light beam irradiated onto said groove track;

β is the area of a region where only the 0th-order diffracted light is present, in the far field diffraction pattern of the reflected light of the light beam irradiated onto said groove track; and d2 is the depth of one of the pits.

12. An optical disk according to claim 11, wherein the wavelength λ is larger than 400 nm and smaller than 900 nm.

13. An optical disk comprising:

neighboring land tracks, each of which having a majority surface and a region whose surface level is different than the level of said majority surfaces of said land tracks; and a groove track placed between said land tracks, said groove track having a majority surface and a region whose surface level is different than the surface level of said majority surface of said groove track, said differences in level from said majority surfaces of said land and groove tracks is opposite in direction relative to said respective levels of the respective majority surfaces of said land and groove tracks, wherein information is recorded by said regions.

14. An optical disk according to claim 13, wherein said difference between the levels of said majority surface and said surface of said region of said land tracks is equal to the difference between the levels of said majority surface and said surface of said region of said groove track.

\* \* \* \* \*